(12) United States Patent
Maeno et al.

(10) Patent No.: US 11,798,332 B2
(45) Date of Patent: Oct. 24, 2023

(54) INFORMATION PROCESSING APPARATUS, INFORMATION PROCESSING SYSTEM, AND INFORMATION PROCESSING METHOD

(71) Applicant: NEC Corporation, Tokyo (JP)

(72) Inventors: Yumi Maeno, Tokyo (JP); Takahiro Nishi, Tokyo (JP); Yutaro Nashimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 101 days.

(21) Appl. No.: 16/589,636

(22) Filed: Oct. 1, 2019

(65) Prior Publication Data

US 2020/0105080 A1 Apr. 2, 2020

(30) Foreign Application Priority Data

Oct. 2, 2018 (JP) .................................. 2018-187302

(51) Int. Cl.
*G07C 9/00* (2020.01)
*G06K 9/00* (2022.01)
*H04L 29/08* (2006.01)
*H04L 67/10* (2022.01)
*G06V 40/16* (2022.01)
*G06Q 40/02* (2023.01)

(52) U.S. Cl.
CPC ....... *G07C 9/00563* (2013.01); *G06V 40/172* (2022.01); *H04L 67/10* (2013.01); *G06Q 40/02* (2013.01)

(58) Field of Classification Search
CPC ........... G06K 9/00288; G06K 9/00771; G06K 9/00221; G06K 9/00892; G06K 9/00979; G06K 9/6807; G07C 9/00563; G07C 9/37; G07C 9/38; H04L 67/10; G06Q 40/02

See application file for complete search history.

(56) References Cited

U.S. PATENT DOCUMENTS 6,119,096 A * 9/2000 Mann ................... G06Q 20/341
705/5
7,039,221 B1 * 5/2006 Tumey ............... G06K 9/00221
382/118

(Continued)

FOREIGN PATENT DOCUMENTS

| JP | 2010-128938 A | 6/2010 | |
| JP | 2010128938 A * | 6/2010 | ......... G07C 9/00071 |
| JP | 6246403 B1 | 12/2017 | |

OTHER PUBLICATIONS

Japanese Office Action for JP Application No. 2018-187302 dated Sep. 27, 2022 with English Translation.

*Primary Examiner* — Michael J Vanchy, Jr.
(74) *Attorney, Agent, or Firm* — Sughrue Mion, PLLC

(57) ABSTRACT

An information processing apparatus in the present invention includes: an acquisition unit that acquires a first biometrics information group including biometrics information on a first person detected from a first image captured in a first area from a registered biometrics information group including biometrics information on a plurality of registrants; and a matching unit that matches biometrics information on a second person detected from a second image captured in a second area that is different from the first area against biometrics information included in the first biometrics information group.

14 Claims, 25 Drawing Sheets

(56) References Cited

U.S. PATENT DOCUMENTS

| | | | | |
|---|---|---|---|---|
| 2007/0046426 A1* | 3/2007 | Ishibashi | ............... | G07C 9/257 |
| | | | | 340/5.52 |
| 2011/0167727 A1* | 7/2011 | Kamise | ................... | G07C 9/15 |
| | | | | 49/70 |
| 2013/0063581 A1* | 3/2013 | Komatsu | ............ | G06K 9/00288 |
| | | | | 348/77 |
| 2014/0347479 A1* | 11/2014 | Givon | .................. | G06V 40/103 |
| | | | | 382/116 |
| 2017/0070501 A1* | 3/2017 | Saito | ................... | H04L 63/0861 |
| 2018/0181737 A1* | 6/2018 | Tussy | ..................... | G06F 21/32 |

* cited by examiner

FIG. 5
REGISTRANT INFORMATION
| Registrant ID | Name | Address | Contact information | Face image | Face feature amount | ... |
|---|---|---|---|---|---|---|
| 00001 | [Name NM1] | [Address A1] | [Contact information C1] |  | [Face feature amount D1] | ... |
| 00002 | [Name NM2] | [Address A2] | [Contact information C2] |  | [Face feature amount D2] | ... |
| ... | ... | ... | ... | ... | ... | ... |
| 01023 | [Name NM3] | [Address A3] | [Contact information C3] | 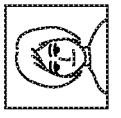 | [Face feature amount D3] | ... |
| 01024 | [Name NM4] | [Address A4] | [Contact information C4] | 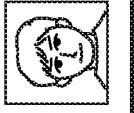 | [Face feature amount D4] | ... |
| ... | ... | ... | ... | ... | ... | ... |

FIG. 6

CANDIDATE INFORMATION

| Detection SEQ | Face feature amount | DB registration time | ... |
|---|---|---|---|
| 00101 | [Face feature amount D5] | [registration time t1] | ... |
| 00102 | [Face feature amount D6] | [registration time t2] | ... |
| ... | ... | ... | ... |
| 00323 | [Face feature amount D2] | [registration time t3] | ... |
| 00324 | [Face feature amount D8] | [registration time t4] | ... |
| ... | ... | ... | ... |

FIG. 10

MEMBER INFORMATION

| Member ID | Name | Address | Contact information | Balance information | Automatic charge | ... |
|---|---|---|---|---|---|---|
| 00001 | [Name NM1] | [Address A1] | [Contact information C1] | ¥3,502 | Not available | ... |
| 00002 | [Name NM2] | [Address A2] | [Contact information C2] | ¥20,350 | Available | ... |
| ... | ... | ... | ... | ... | ... | ... |
| 01023 | [Name NM3] | [Address A3] | [Contact information C3] | ¥10,805 | Available | ... |
| 01024 | [Name NM4] | [Address A4] | [Contact information C4] | ¥5,708 | Available | ... |
| ... | ... | ... | ... | ... | | ... |

FIG. 25

REGISTRANT INFORMATION

| Registrant ID | Name | Address | Contact information | Face image | Face feature amount | Candidate flag |
|---|---|---|---|---|---|---|
| 00001 | [Name NM1] | [Address A1] | [Contact information C1] | 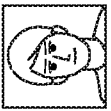 | [Face feature amount D1] | 0 |
| 00002 | [Name NM2] | [Address A2] | [Contact information C2] |  | [Face feature amount D2] | 1 |
| ... | ... | ... | ... | ... | ... | ... |
| 01023 | [Name NM3] | [Address A3] | [Contact information C3] | 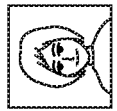 | [Face feature amount D3] | 0 |
| 01024 | [Name NM4] | [Address A4] | [Contact information C4] |  | [Face feature amount D4] | 1 |
| ... | ... | ... | ... | ... | ... | ... |

INFORMATION PROCESSING APPARATUS, INFORMATION PROCESSING SYSTEM, AND INFORMATION PROCESSING METHOD

INCORPORATION BY REFERENCE

This application is based upon and claims the benefit of priority from Japanese patent application No. 2018-187302, filed on Oct. 2, 2018, the disclosure of which is incorporated herein in its entirety by reference.

TECHNICAL FIELD

The present invention relates to an information processing apparatus, an information processing system, and an information processing method.

BACKGROUND ART

Japanese Patent No. 6246403 discloses an entry and exit management system that has an authentication server configured to match input biometrics information against biometrics information on a registered user to perform identity verification and unlocks a gate based on authentication and permission from the authentication server.

SUMMARY

In the system illustrated as an example in Japanese Patent No. 6246403, a face feature amount of a person captured in an authentication area is sequentially matched against face feature amounts of N registrants (N is an integer greater than one) pre-stored in a database. Thus, as the population N of registrants becomes larger, the authentication accuracy or the authentication speed in the face recognition may decrease.

Accordingly, in view of the problem described above, the present invention intends to provide an information processing apparatus, an information processing system, and an information processing method that can improve the authentication accuracy and the authentication speed in face recognition.

According to one example aspect of the present invention, provided is an information processing apparatus including: an acquisition unit that acquires a first biometrics information group including biometrics information on a first person detected from a first image captured in a first area from a registered biometrics information group including biometrics information on a plurality of registrants; and a matching unit that matches biometrics information on a second person detected from a second image captured in a second area that is different from the first area against biometrics information included in the first biometrics information group.

According to another example aspect of the present invention, provided is an information processing apparatus including: a storage unit that stores a registered biometrics information group including biometrics information on registrants; a first matching unit that matches biometrics information on a first person detected from a first image captured in a first area against biometrics information included in the registered biometrics information group; an identifying unit that identifies a first biometrics information group including biometrics information on the first person from the registered biometrics information group based on a matching result in the first matching unit; and a second matching unit that matches biometrics information on a second person detected from a second image captured in a second area that is different from the first area against biometrics information included in the first biometrics information group.

According to yet another example aspect of the present invention, provided is an information processing apparatus including: a storage unit that stores a registered biometrics information group including biometrics information on a plurality of registrants; a matching unit that matches biometrics information on a first person detected from a first image captured in a first area against biometrics information included in the registered biometrics information group; an identifying unit that identifies a first biometrics information group including biometrics information on the first person from the registered biometrics information group based on a matching result in the matching unit; and an output unit that outputs the first biometrics information group used for a matching operation of biometrics information on a second person detected in a second area that is different from the first area.

According to yet another example aspect of the present invention, provided is an information processing system including: a first camera that captures a first area to generate a first image; a second camera that captures a second area that is different from the first area to generate a second image; a first server that matches biometrics information on a first person detected from the first image against a registered biometrics information group including biometrics information on a plurality of registrants and identifies a first biometrics information group including biometrics information on the first person from the registered biometrics information group; and a second server that matches biometrics information on a second person detected from the second image against biometrics information included in the first biometrics information group.

According to yet another example aspect of the present invention, provided is an information processing method including: acquiring a first biometrics information group including biometrics information on a first person detected from a first image captured in a first area from a registered biometrics information group including biometrics information on a plurality of registrants; and matching biometrics information on a second person detected from a second image captured in a second area that is different from the first area against biometrics information included in the first biometrics information group.

According to yet another example aspect of the present invention, provided is a program that causes a computer to perform: acquiring a first biometrics information group including biometrics information on a first person detected from a first image captured in a first area from a registered biometrics information group including biometrics information on a plurality of registrants; and matching biometrics information on a second person detected from a second image captured in a second area that is different from the first area against biometrics information included in the first biometrics information group.

According to the present invention, it is possible to provide an information processing apparatus, an information processing system, and an information processing method that can improve the authentication accuracy and the authentication speed in face recognition.

BRIEF DESCRIPTION OF THE DRAWINGS

FIG. 5 is a diagram illustrating one example of registrant information stored in the center server in the first example embodiment.

FIG. 6 is a diagram illustrating one example of candidate information stored in the relay server in the first example embodiment.

FIG. 10 is a diagram illustrating one example of member information stored in an external server in the second example embodiment.

FIG. 25 is a diagram illustrating one example of information stored in a management server in a modified example embodiment.

EXAMPLE EMBODIMENT

Figure 1:
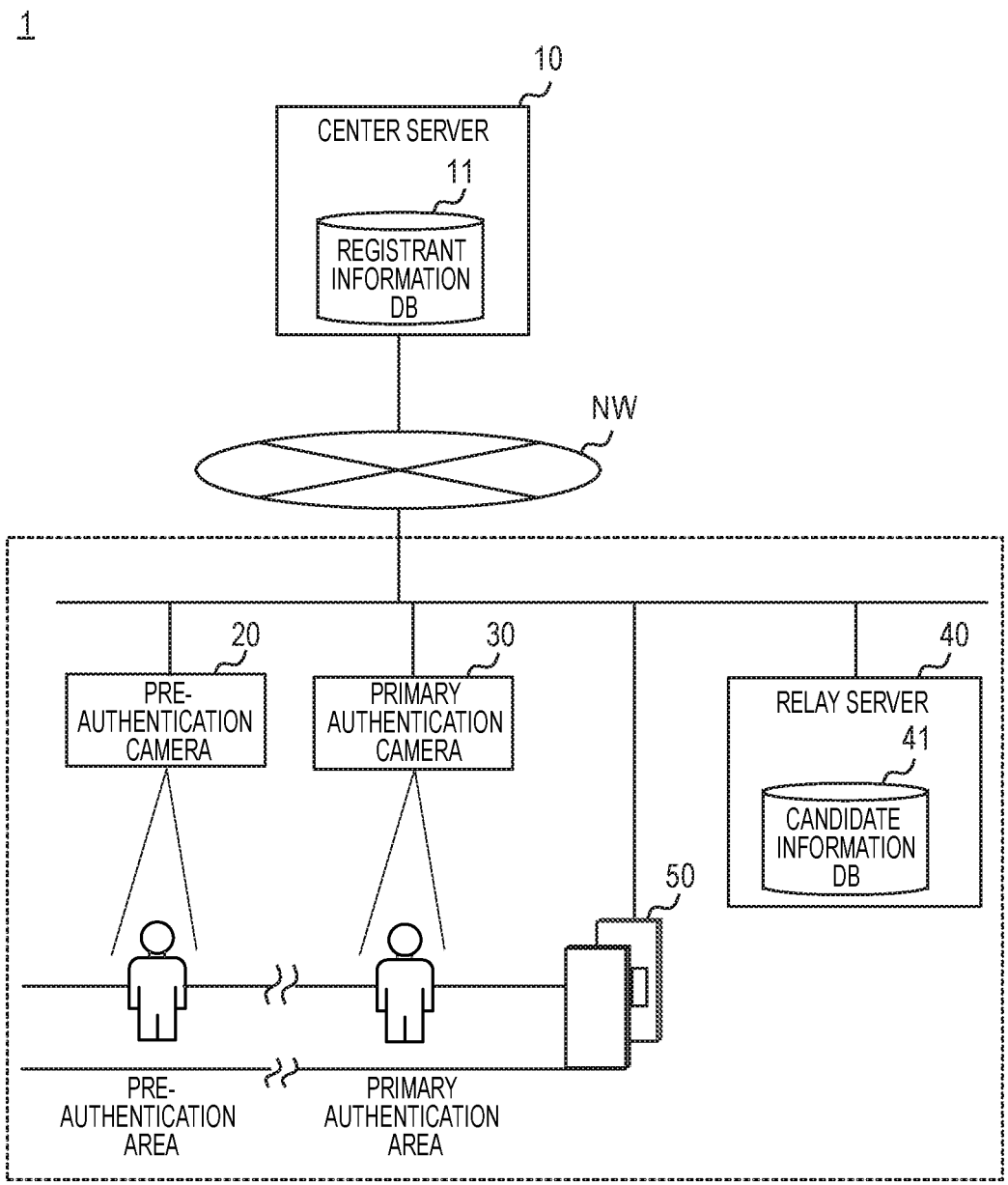
FIG. 1 is a diagram illustrating the entire configuration example of an information processing system in a first example embodiment.

Illustrative example embodiments of the present invention will be described below with reference to the drawings. In the drawings, the same elements or corresponding elements are labeled with the same reference, and the description thereof may be omitted or simplified.

First Example Embodiment

The configuration of an information processing system 1 in the present example embodiment will be described with reference to FIG. 1 to FIG. 6. The information processing system 1 of the present example embodiment is a computer system that manages entry and exit of a number of persons by using a face recognition technology in a large scaled facility such as an event site, a theme park, a traffic facility (a railroad facility or an airport), a hotel, or the like, for example.

FIG. 1 is a diagram illustrating the entire configuration example of the information processing system 1 in the present example embodiment. As illustrated in FIG. 1, the information processing system 1 has a center server 10, a pre-authentication camera 20, a primary authentication camera 30, a relay server 40, and a gate apparatus 50. Each apparatus is connected to a network NW such as a Local Area Network (LAN) or the Internet. Note that the dashed-line box in FIG. 1 illustrates a base where management of entry and exit is performed. Other apparatuses than the center server 10 are installed inside the base.

The center server 10 is an information processing apparatus (first server) that centrally manages information on the base. While FIG. 1 illustrates only one base, the number of bases is not limited thereto. Further, the center server 10 has a registrant information database 11 that pre-stores biometrics information on a person who wishes to use this system (hereafter, referred to as "registrant"). The biometrics information may be a face image, a fingerprint image, an iris image, a finger vein image, a palm print image, a palm vein image, or the like. One or multiple pieces of biometrics information may be used.

Note that the term "biometrics information" in the present example embodiment means a face image and a feature amount extracted from the face image. A face image of a registrant is obtained by an image file being uploaded from a user when the user makes online membership registration, for example. Further, the center server 10 and the relay server 40 each have a function of detecting biometrics information on a person from a received captured image. A feature amount extracted from a face image (also referred to as "face feature amount") may be an amount indicating a feature of a face such as a position of a characteristic part such as a pupil, a nose, a mouth end, for example.

Figure 2:
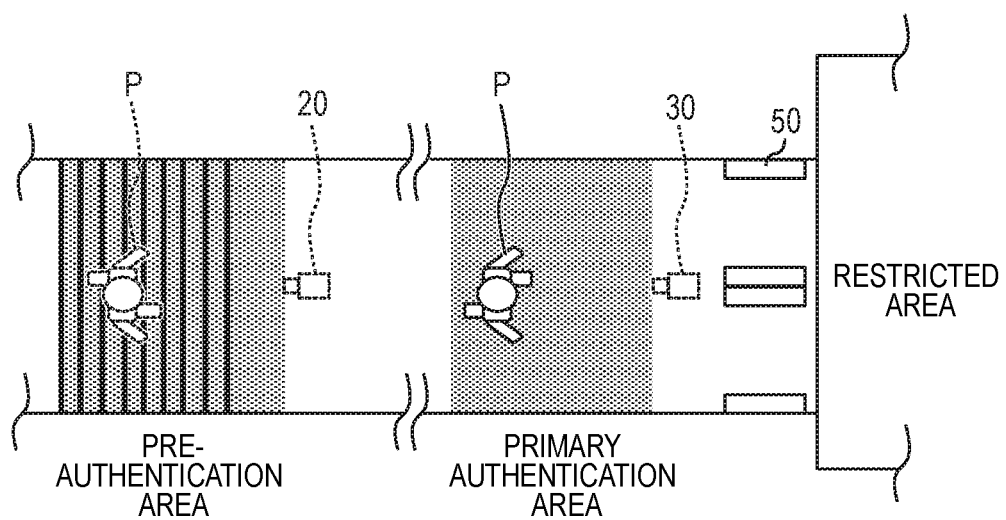
FIG. 2 is a diagram illustrating a positional relationship of a plurality of authentication areas in the first example embodiment.

FIG. 2 is a diagram illustrating a positional relationship of a plurality of authentication areas in the present example embodiment. As illustrated in FIG. 1 and FIG. 2, the authentication area is generally categorized in two types of a pre-authentication area (first area) and a primary authentication area (second area). The pre-authentication area is an area used for performing pre-authentication and is set to a position that is more distant from a restricted area than the primary authentication area. In contrast, the primary authentication area is an area used for performing final authentication and is set to a position close to the restricted area.

The pre-authentication camera 20 is an image capture device (first camera) that captures the pre-authentication area to generate a first image. As illustrated in FIG. 2, it is preferable that the pre-authentication camera 20 be installed in a passage, stairs, or the like through which users necessarily pass when moving to the primary authentication area, for example. Further, the pre-authentication area is not limited to one place but may be set in a plurality of places in a base facility. Similarly, the number of pre-authentication cameras 20 in the pre-authentication area is not limited to one. For example, a plurality of them may be installed in a single pre-authentication area. The primary authentication camera 30 is an image capture device (second camera) that captures a primary authentication area, which is different from the pre-authentication area, to generate a second image.

The center server 10 matches biometrics information on a person detected from the first image (hereafter, referred to as "first person") against a registered biometrics information group including biometrics information on a plurality of registrants and identifies first biometrics information group including biometrics information on the first person from the registered biometrics information group. The center server 10 then transmits, to the relay server 40, the first biometrics information group narrowed from the registered biometrics information group (registrant information) as candidate information.

The relay server 40 is an information processing apparatus (second server) that performs a face recognition process of a person at each base. The relay server 40 matches biometrics information on a person detected from the second image captured in the primary authentication area (hereafter, referred to as "second person") against biometrics information included in the first biometrics information group. The relay server 40 has a candidate information database 41 that stores candidate information received from the center server 10 side (first biometrics information group). The gate apparatus 50 is a passage restriction apparatus installed between the primary authentication area and the restriction area. The passage restriction apparatus is not limited to the gate apparatus such as an automatic ticket gate but may be a door apparatus.

Figure 3:
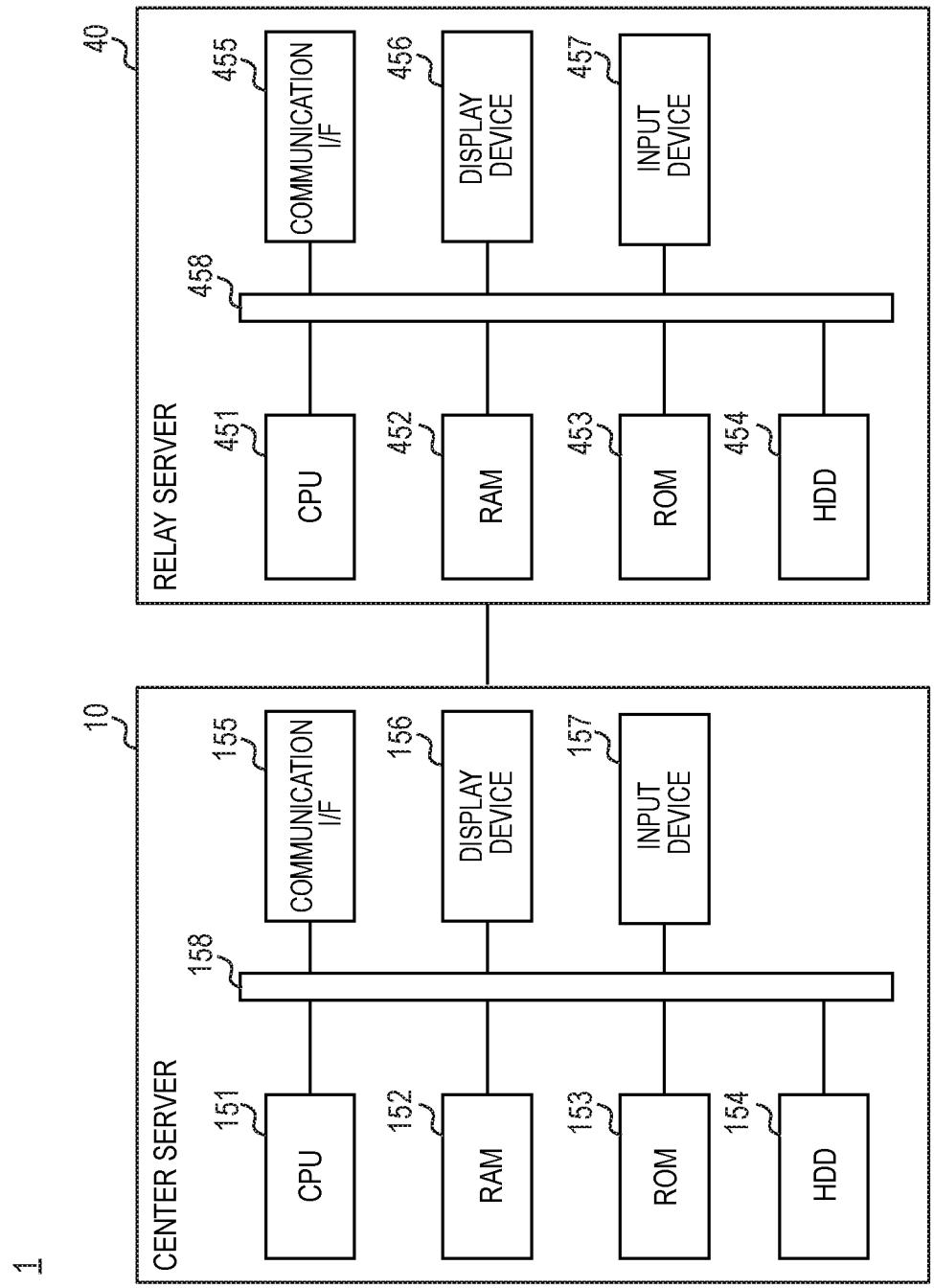
FIG. 3 is a block diagram illustrating a hardware configuration example of a center server and a relay server in the first example embodiment.

FIG. 3 is a block diagram illustrating a hardware configuration example of the center server 10 and the relay server 40. The center server 10 has a central processing unit (CPU) 151, a random access memory (RAM) 152, a read only memory (ROM) 153, and a hard disk drive (HDD) 154 as a computer that performs operation, control, and storage. Further, the information processing system 1 has a communication interface (I/F) 155, a display device 156, and an input device 157. The CPU 151, the RAM 152, the ROM 153, the HDD 154, the communication I/F 155, the display device 156, and the input device 157 are connected to each other via a bus 158. Note that the display device 156 and the input device 157 may be connected to the bus 158 via a drive device (not illustrated) used for driving these devices.

While the above components forming the center server 10 are illustrated as an integrated device in FIG. 3, some of these functions may be provided by an externally connected device. For example, the display device 156 and the input device 157 may be other externally connected devices other than a component forming a function of a computer including the CPU 151 or the like.

The CPU 151 is a processor having a function of performing a predetermined operation in accordance with a program stored in the ROM 153, the HDD 154, or the like and controlling each component of the center server 10. The RAM 152 is formed of a volatile storage medium and provides a temporal memory region necessary for the operation of the CPU 151. The ROM 153 is formed of nonvolatile storage medium and stores necessary information such as a program used for the operation of the center server 10. The HDD 154 is a storage device that is formed of a nonvolatile storage medium and stores data necessary for processing, an operation program of the center server 10, or the like.

The communication I/F 155 is a communication interface based on the specification such as Ethernet (registered trademark), Wi-Fi (registered trademark), 4G, or the like, which is a module used for communicating with other apparatuses. The display device 156 is a liquid crystal display, an OLED display, or the like and is used for displaying an image, a text, an interface, or the like. The input device 157 is a keyboard, a pointing device, or the like and is used by the user for operating the information processing system 1. An example of the pointing device may be a mouse, a trackball, a touchscreen, a pen tablet, or the like. The display device 156 and the input device 157 may be integrally formed as a touchscreen.

Note that, since the functions of a CPU 451, a RAM 452, a ROM 453, an HDD 454, a communication I/F 455, a display device 456, an input device 457, and a bus 458 provided in the relay server 40 are the same as the functions of the CPU 151, the RAM 152, the ROM 153, the HDD 154, the communication I/F 155, the display device 156, the input device 157, and the bus 158 of the center server 10, the description thereof will be omitted.

Further, the hardware configuration illustrated in FIG. 3 is an example, and other devices than the above may be added, or some of the devices may not be provided. Further, some of the devices may be replaced with another device having the same function. Furthermore, a part of the function of the present example embodiment may be provided by another device via a network, the function of the present example embodiment may be implemented by being distributed in a plurality of devices. For example, the HDD 154 may be replaced with a solid state drive (SSD) with a semiconductor memory or may be replaced with a cloud storage.

Figure 4:
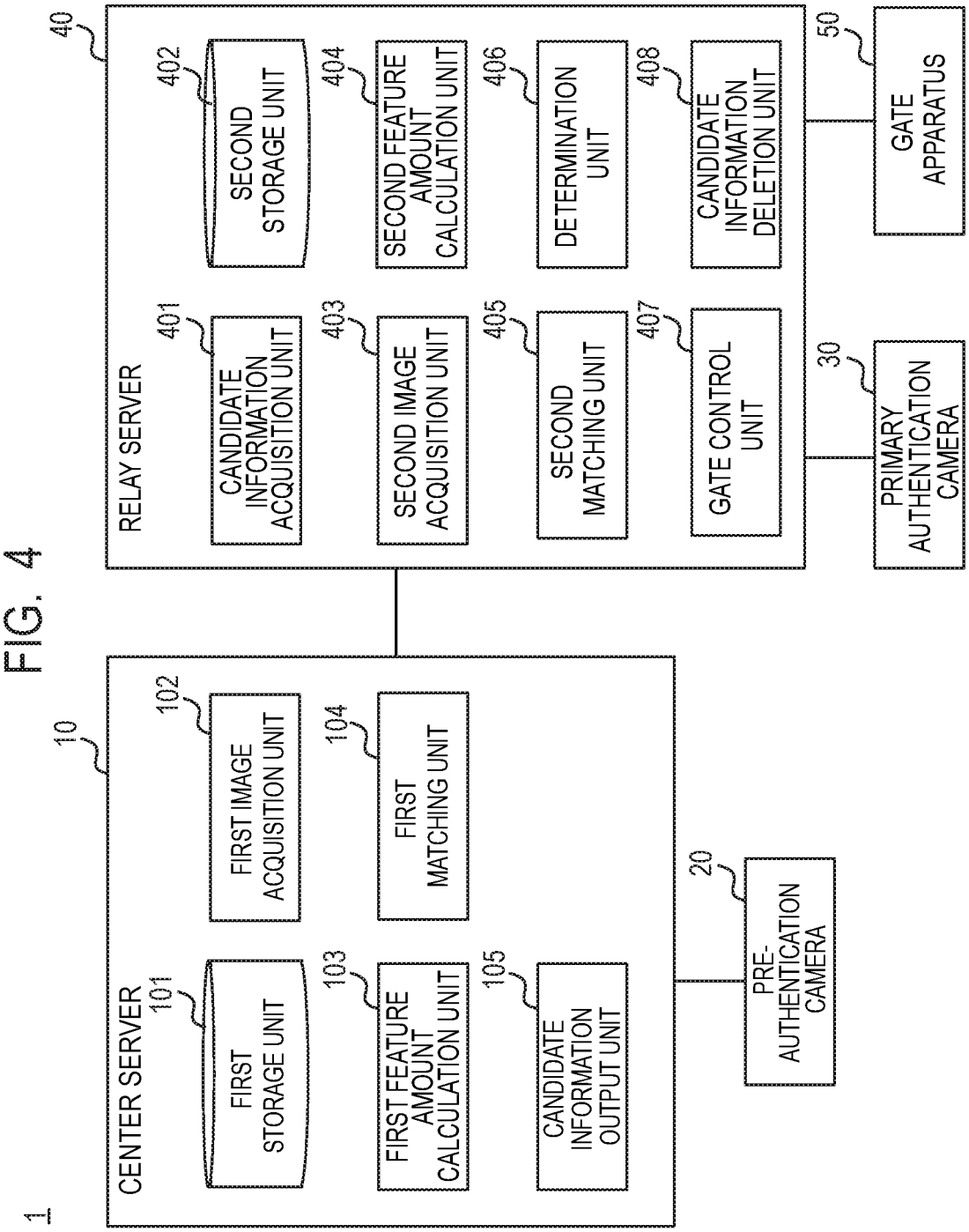
FIG. 4 is a functional block diagram of the information processing system in the first example embodiment.

FIG. 4 is a functional block diagram of the information processing system 1 in the present example embodiment. The center server 10 has a first storage unit 101, a first image acquisition unit 102, a first feature amount calculation unit 103, a first matching unit 104, and a candidate information output unit 105. Further, the relay server 40 has a candidate information acquisition unit 401, a second storage unit 402, a second image acquisition unit 403, a second feature amount calculation unit 404, a second matching unit 405, a determination unit 406, a gate control unit 407, and a candidate information deletion unit 408.

The CPU 151 of the center server 10 loads a program stored in the ROM 153, the HDD 154, or the like to the RAM 152 and executes the program. Thereby, the CPU 151 of the center server 10 implements the functions of the first image acquisition unit 102, the first feature amount calculation unit 103, the first matching unit 104, and the candidate information output unit 105. Furthermore, the CPU 151 of the center server 10 implements the function of the first storage unit 101 by controlling the HDD 154. In the present example embodiment, the registrant information database 11 corresponds to the first storage unit 101.

Similarly, the CPU 451 of the relay server 40 loads a program stored in the ROM 453, the HDD 454, or the like to the RAM 452 and executes the program. Thereby, the CPU 451 of the relay server 40 implements the functions of the candidate information acquisition unit 401, the second image acquisition unit 403, the second feature amount calculation unit 404, the second matching unit 405, the determination unit 406, the gate control unit 407, and the candidate information deletion unit 408. The process performed by each of these units will be described later. Furthermore, the CPU 451 of the relay server 40 implements the function of the second storage unit 402 by controlling the HDD 454. In the present example embodiment, the candidate information database 41 corresponds to the second storage unit 402.

FIG. 5 is a diagram illustrating one example of registrant information stored in the center server 10 (the registrant information database 11) in the present example embodiment. In this example, the data item of registrant information includes "registrant ID", "name", "address", "contact information", "face image", and "face feature amount". For example, in the registrant information for registrant ID "00001", the name of a person is "[name NM1]", the address is "[address A1]", and the contact information is "[contact information C1]". Further, it is indicated that the face feature amount (biometrics information) calculated from a face image of a person for the registrant ID "00001" is "[face feature amount D1]".

FIG. 6 is a diagram illustrating one example of candidate information stored in the relay server 40 (the candidate information database 41) in the present example embodiment. In this example, the data item of candidate information includes "detection SEQ", "face feature amount", and "DB registration time". The detection SEQ indicates the detection order in the pre-authentication area. The DB registration date and time indicates data and time when candidate information received from the center server 10 is registered in the candidate information database 41. For example, in the candidate information for the detection SEQ "00101", it is indicated that the face feature amount is "[face feature amount D5]" and that the information is registered in the candidate information database 41 when the DB registration time is "[registration time t1]".

Figure 7:
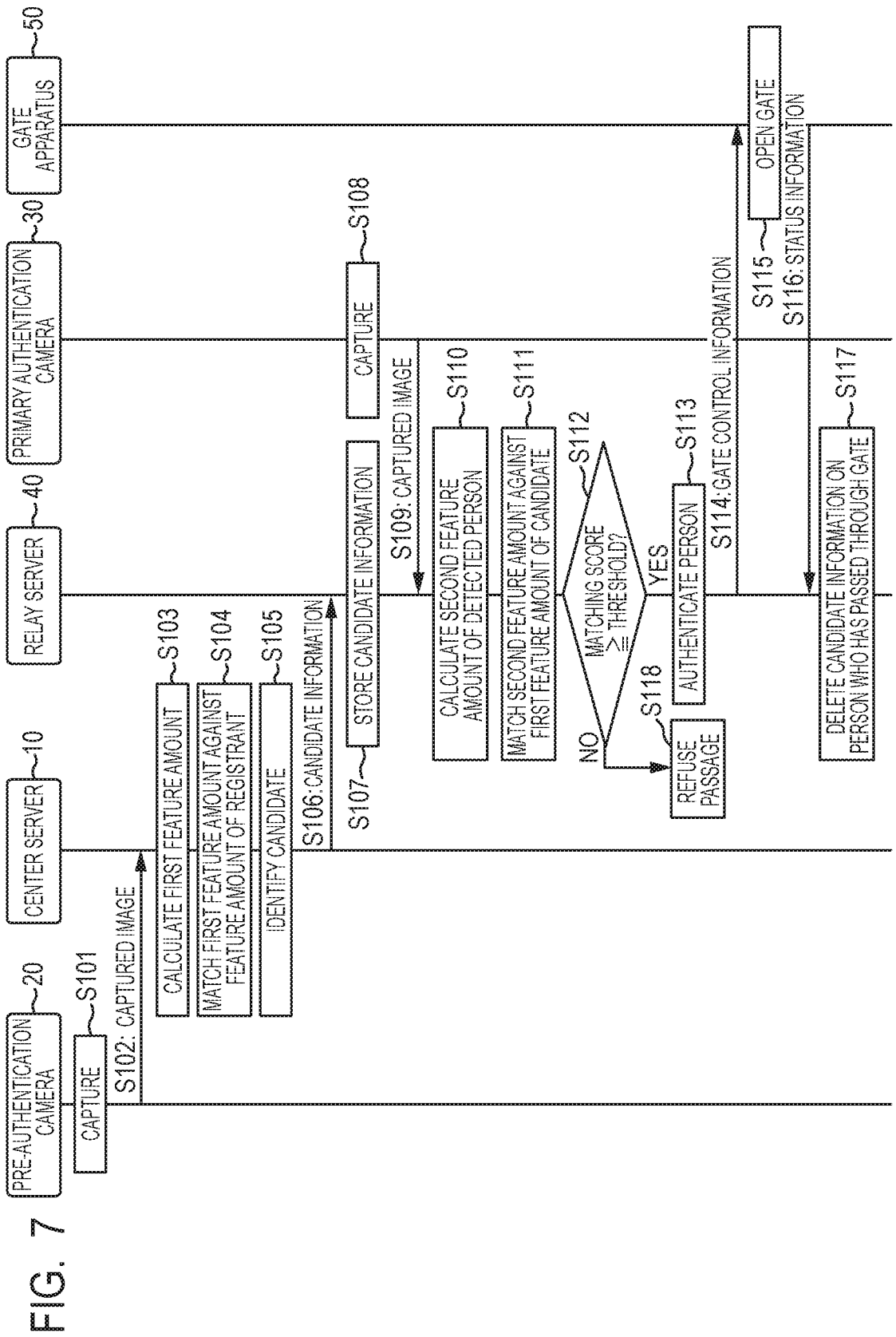
FIG. 7 is a sequence diagram illustrating one example of the process in the information processing system in the first example embodiment.

Next, the effect and advantage of the information processing system 1 in the present example embodiment will be described with reference to FIG. 7. FIG. 7 is a sequence diagram illustrating one example of the process in the information processing system 1.

First, the pre-authentication camera 20 captures a pre-authentication area (step S101) and transmits the captured image to the center server 10 (step S102). Next, when the first image acquisition unit 102 of the center server 10 receives the captured image from the pre-authentication camera 20, the first feature amount calculation unit 103 of the center server 10 calculates a first feature amount of a detected person (first person) included in the received captured image (step S103).

Next, the first matching unit 104 of the center server 10 matches the first feature amount of the detected person against feature amounts of registrants stored in the registrant information database 11 (step S104). Next, if a matching score between the first feature amount of the detected person and each of the feature amounts of registrants is greater than or equal to a predetermined threshold (determination reference value), the first matching unit 104 identifies a registrant having the highest matching score as a candidate out of the relevant persons (step S105). Note that the number of candidates matched and identified by the center server 10 is not limited to one. When a plurality of persons have the matching score greater than or equal to the predetermined threshold (determination reference value), the plurality of persons may be identified.

Next, the candidate information output unit 105 of the center server 10 transmits candidate information on the person identified from the registrants by the matching process to the relay server 40 (step S106). Next, the candidate information acquisition unit 401 of the relay server 40 stores the candidate information received from the center server 10 in the candidate information database 41 that is the second storage unit 402 (step S107).

The primary authentication camera 30 captures a primary authentication area (step S108) and transmits the captured image to the relay server 40 (step S109). Next, when the second image acquisition unit 403 of the relay server 40 receives the captured image from the primary authentication camera 30, the second feature amount calculation unit 404 calculates a second feature amount of the detected person (second person) included in the received captured image (step S110). The second matching unit 405 of the relay server 40 then matches the second feature amount against each of the first feature amounts of candidates (step S111).

Next, the determination unit 406 of the relay server 40 determines whether or not the matching score between the second feature amount of the detected person and each of the first feature amounts of the candidates is greater than or equal to a predetermined threshold (determination reference value) (step S112). In this step, if the determination unit 406 of the relay server 40 determines that the matching score between the feature amounts is greater than or equal to the threshold (step S112: YES), the determination unit 406 identifies a candidate having the highest matching score between the feature out of the relevant candidates amounts and authenticates the detected person (step S113). That is, it is considered that the two feature amounts are matched. Next, the gate control unit 407 of the relay server 40 transmits gate control information to the gate apparatus 50 (step S114).

The gate apparatus 50 opens the gate based on the gate control information received from the relay server 40 (step S115) and, in response, transmits status information indicating the completion of gate opening to the relay server 40 (step S116).

If the determination unit 406 of the relay server 40 determines that the matching score between the feature amounts is less than the threshold (step S112: NO), the determination unit 406 performs determination on the detected person (second person) as to refuse passage (step S118) and ends the process. In this case, a closed state is maintained at the gate apparatus 50.

In step S117, the candidate information deletion unit 408 of the relay server 40 deletes, from the candidate information database 41 and ends the process, candidate information related to a person who has passed through the gate. Note that, while the above process has been described based on the condition where the initial state of the gate apparatus 50 is a closed state, the initial state may be an opened state. In such a case, when it is determined that the matching score is less than the threshold, the gate apparatus 50 is controlled from an open state to a closed state. Further, if the matching score is less than the threshold, an alert may be output from the gate apparatus 50 or the like by a voice, a light, a text, or the like, for example, instead of controlling the opening/closing operation of the gate apparatus 50.

When the first person detected from a captured image of a pre-authentication area is registered as a registrant, the information processing system 1 in the present example embodiment identifies, from a plurality of registrants, the first person as a candidate for a matching process with a person detected from a captured image of a primary authentication area, and the candidate information is transmitted from the center server 10 to the relay server and stored therein. The final authentication is then performed by a comparison of the feature amounts between candidates refined in the pre-authentication area and a person detected from a captured image of the primary authentication area. That is, since the final authentication is performed after the number of persons belonging to the population N of 1-to-N face recognition is significantly reduced, the authentication accuracy and the authentication speed in the final authentication can be significantly improved.

Further, the information processing system 1 in the present example embodiment is configured so that information on the candidate who has completed primary authentication is deleted immediately after the passage of the gate. Thus, it is possible to prevent unnecessary candidate information from being accumulated in the candidate information database 41 of the relay server 40. As a result, it is possible to prevent a reduction in the authentication accuracy and the authentication speed in 1-to-N face recognition.

Second Example Embodiment

An information processing system 2 in a second example embodiment will be described below. Note that references common to references provided in the drawings of the first example embodiment denote the same object. Thus, the description of a part common to the first example embodiment will be omitted, and a different part will be described in detail.

Figure 8:
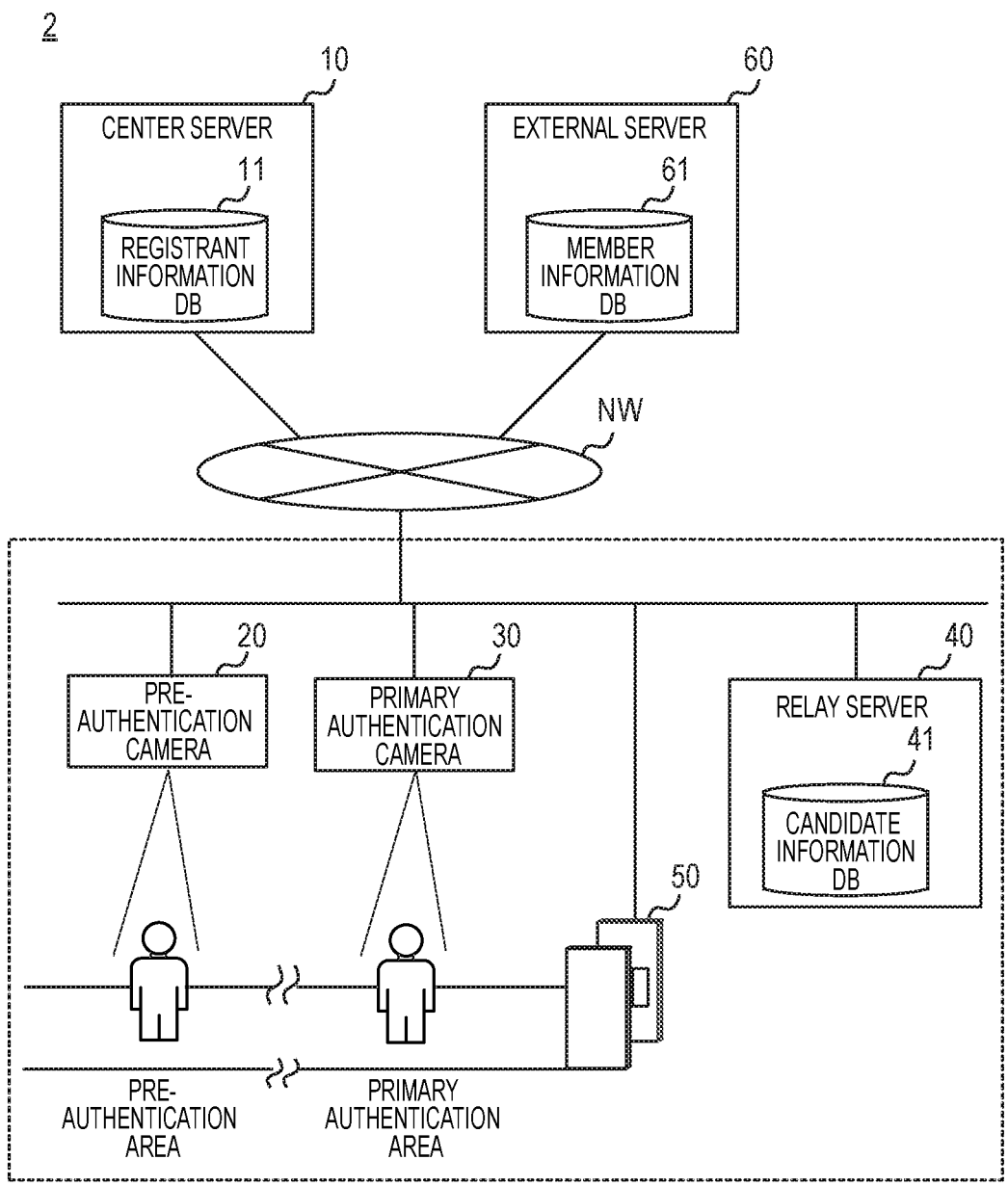
FIG. 8 is a diagram illustrating the entire configuration example of an information processing system in a second example embodiment.

FIG. 8 is a diagram illustrating the entire configuration example of the information processing system 2 in the present example embodiment. As illustrated in FIG. 8, the relay server 40 is connected to the external server 60 via the network NW. The external server 60 is a server used to provide a service by an enterprise that is different from an enterprise that manages the center server 10, for example, and has a member information database 61.

Figure 9:
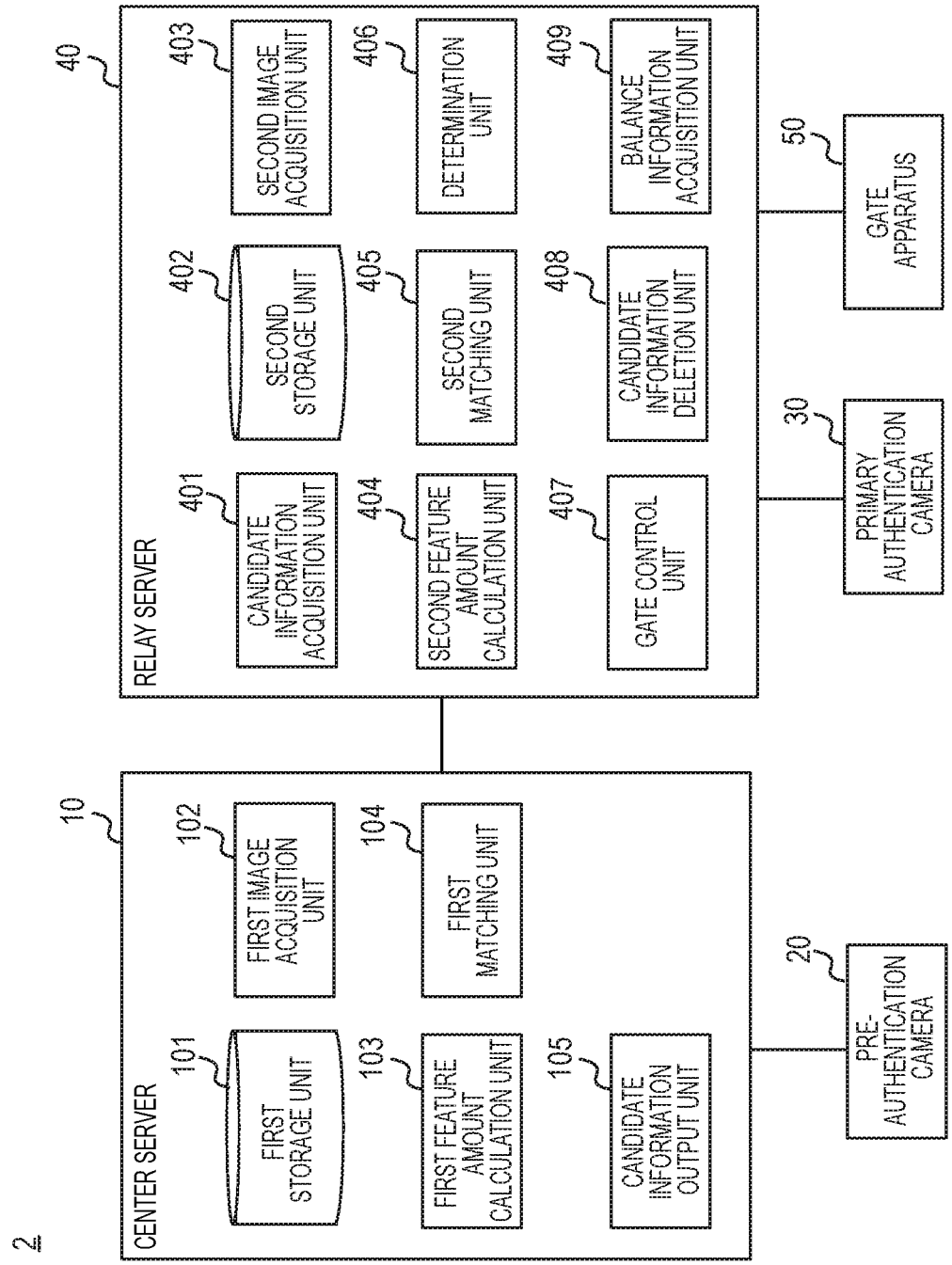
FIG. 9 is a functional block diagram of the information processing system in the second example embodiment.

FIG. 9 is a functional block diagram of the information processing system 2 in the present example embodiment. As illustrated in FIG. 9, the relay server 40 of the present example embodiment is different from the first example embodiment in that the balance information acquisition unit 409 that acquires balance information on a member from the external server 60 is further provided.

FIG. 10 is a diagram illustrating one example of member information stored in the external server 60 in the present example embodiment. Here, as examples of data items of member information, "member ID", "name", "address", "contact information", "balance information", and "automatic charge" are listed. The member ID is a unique ID for each member. The balance information indicates a balance of electronic money that can be used by a member for various services. The automatic charge indicates whether or not a service that automatically adds a set amount when the balance becomes below a certain amount is set. Note that, while the member ID is an ID corresponding to the registrant ID illustrated in FIG. 5 in the present example embodiment, it may be another ID associated with a registrant ID.

Figure 11:
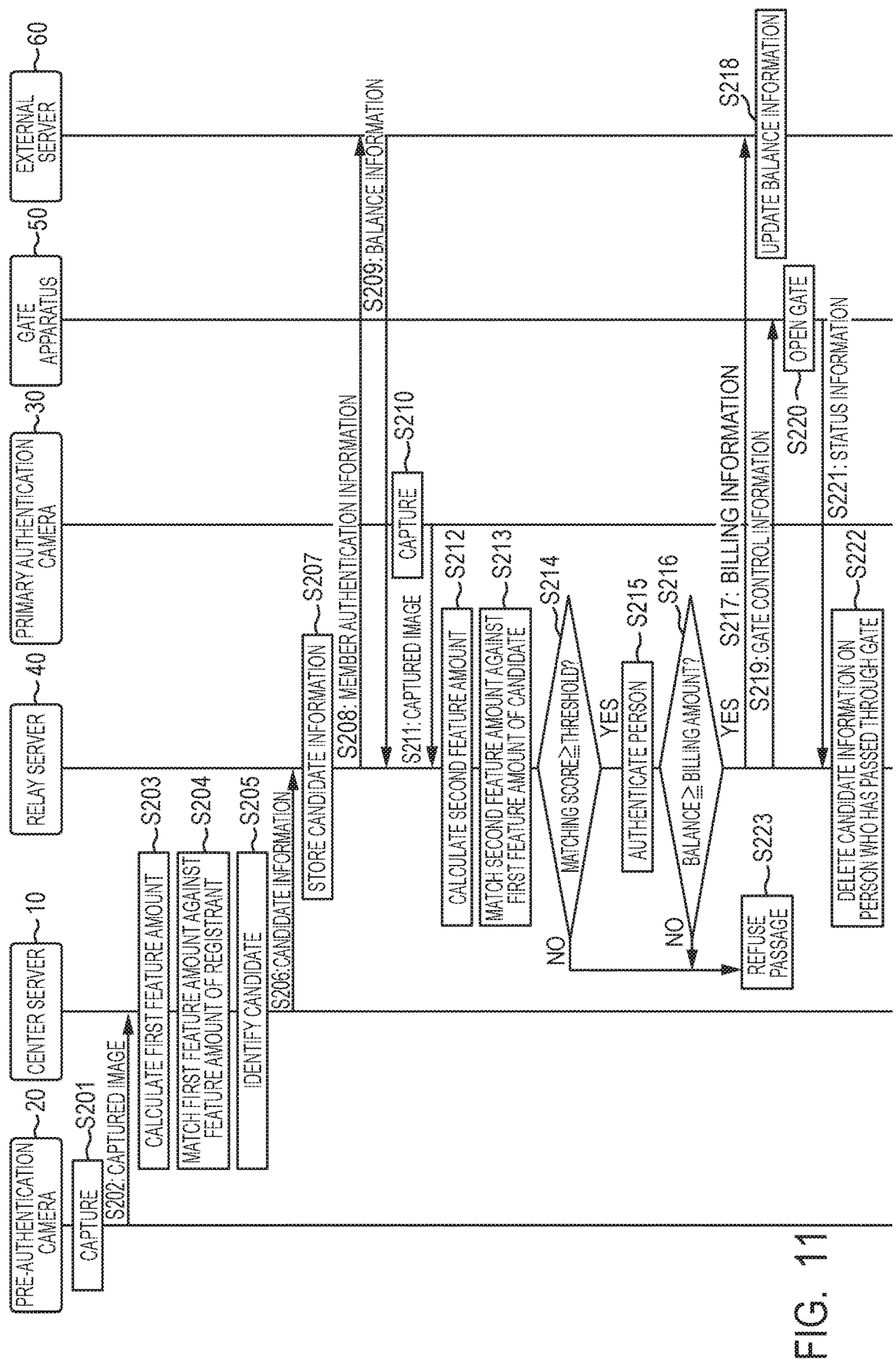
FIG. 11 is a sequence diagram illustrating one example of the process in the information processing system in the second example embodiment.

Next, the effect and advantage of the information processing system 2 in the present example embodiment will be described with reference to FIG. 11. FIG. 11 is a sequence diagram illustrating one example of the process in the information processing system 2.

First, the pre-authentication camera 20 captures the pre-authentication area (step S201) and transmits the captured image to the center server 10 (step S202). Next, when the first image acquisition unit 102 of the center server 10 receives the captured image from the pre-authentication camera 20, the first feature amount calculation unit 103 calculates a first feature amount of a detected person (first person) included in the received captured image (step S203).

Next, the first matching unit 104 of the center server 10 matches the first feature amount against feature amounts of registrants stored in the registrant information database 11 (step S204). Next, if a matching score between the first feature amount of the detected person and each of the feature amounts of registrants is greater than or equal to a predetermined threshold (determination reference value), the first matching unit 104 identifies a person having the highest matching score as a candidate out of the relevant candidates (step S205). Note that the number of candidates matched and identified by the center server 10 is not limited to one. When a plurality of persons have the matching score greater than or equal to the predetermined threshold (determination reference value), the plurality of persons may be identified.

Next, the candidate information output unit 105 of the center server 10 transmits candidate information on the candidate identified from the registrants by the matching process to the relay server 40 (step S206). Next, the candidate information acquisition unit 401 of the relay server 40 stores the candidate information received from the center server 10 in the candidate information database 41 that is the second storage unit 402 (step S207).

Next, the balance information acquisition unit 409 of the relay server 40 transmits member authentication information on the identified candidates to the external server 60 (step S208). The member authentication information may be acquired from the center server 10 together with the candidate information, for example. The external server 60 acquires balance information on the candidates from the member information database 61 based on the member authentication information received from the relay server 40 and transmits the acquired balance information back to the relay server 40 (step S209).

The primary authentication camera 30 captures a primary authentication area (step S210) and transmits the captured image to the relay server 40 (step S211). Next, when the second image acquisition unit 403 of the relay server 40 receives the captured image from the primary authentication camera 30, the second feature amount calculation unit 404 calculates a second feature amount of the detected person (second person) included in the received captured image (step S212). The second matching unit 405 of the relay server 40 then matches the second feature amount against each of the first feature amounts of candidates (step S213).

Next, the determination unit 406 of the relay server 40 determines whether or not the matching score between the second feature amount of the detected person and each of the first feature amounts of the candidates is greater than or equal to a predetermined threshold (determination reference value) (step S214). In this step, if the determination unit 406 of the relay server 40 determines that the matching score between the feature amounts is greater than or equal to the threshold (step S214: YES), the determination unit 406 identifies a candidate having the highest matching score between the feature amounts out of the relevant candidates and authenticates the detected person (step S215). The process then proceeds to step S216.

If the determination unit 406 of the relay server 40 determines that the matching score between the feature amounts is less than the threshold (step S214: NO), the determination unit 406 performs determination on the second person as to refuse passage (step S223) and ends the process.

In step S216, the determination unit 406 of the relay server 40 references the balance information on the first person and determines whether or not the balance is greater than or equal to a billing amount. In this step, if the determination unit 406 of the relay server 40 determines that the balance is greater than or equal to the billing amount (step S216: YES), the relay server 40 transmits billing information to the external server 60 (step S217). In response to this billing information, the external server 60 updates the balance information included in the member information in the member information database 61 (step S218).

Further, in parallel to the process of step S217, the gate control unit 407 of the relay server 40 transmits gate control information to the gate apparatus 50 (step S219).

The gate apparatus 50 opens the gate based on the gate control information received from the relay server 40 (step S220) and, in response, transmits status information indicating the completion of gate opening to the relay server 40 (step S221).

If the determination unit 406 of the relay server 40 determines that the balance is less than the billing amount (step S216: NO), the determination unit 406 performs determination on the second person as to refuse passage (step S223) and ends the process. In this case, a closed state is maintained at the gate apparatus 50.

In step S222, the candidate information deletion unit 408 of the relay server 40 deletes candidate information related to a person who has passed through the gate from the candidate information database 41 and ends the process. Note that, while a process of comparing a balance with a billing amount (step S216) is performed after the process of determining a matching score between the first feature amount and the second feature amount (step S214) in the sequence diagram of FIG. 11, the order of the processes is not limited thereto. For example, the process of comparing a balance with a billing amount of a registrant (candidate) (step S216) may be performed immediately after the relay server 40 receives balance information from the external server 60. In such a case, when the relay server 40 determines that the balance is less than the billing amount, it is preferable to further perform a process to delete the candidate information corresponding to the candidate with an insufficient balance from the candidate information database 41. Once the corresponding candidate information is deleted from the relay server 40, the relay server 40 determines that there is no candidate information in which the matching score is greater than or equal to a threshold in the subsequent determination process (corresponding to step S214). Thus, in the same manner as FIG. 11, the relay server 40 is able to refuse passage by a registrant with an insufficient balance.

The information processing system 2 in the present example embodiment is configured to determine whether or not to permit passage to the restricted area by taking into consideration of not only a matching result of face feature amounts but also balance information on a candidate acquired from the affiliated external server 60 and thus can determine a person who is allowed to use a service. Further, since the relay server 40 has balance information on a candidate before capturing the candidate by the primary authentication camera 30 installed near the gate apparatus 50, the relay server 40 can immediately open the gate when determining that the matching score between the second feature amount of the captured image captured by the primary authentication camera 30 and the first feature amount is greater than or equal to a threshold.

Third Example Embodiment

An information processing system 3 in a third example embodiment will be described below. Note that references common to references provided in the drawings of the first example embodiment denote the same object. Thus, the description of a part common to the first example embodiment will be omitted, and a different part will be described in detail.

Figure 12:
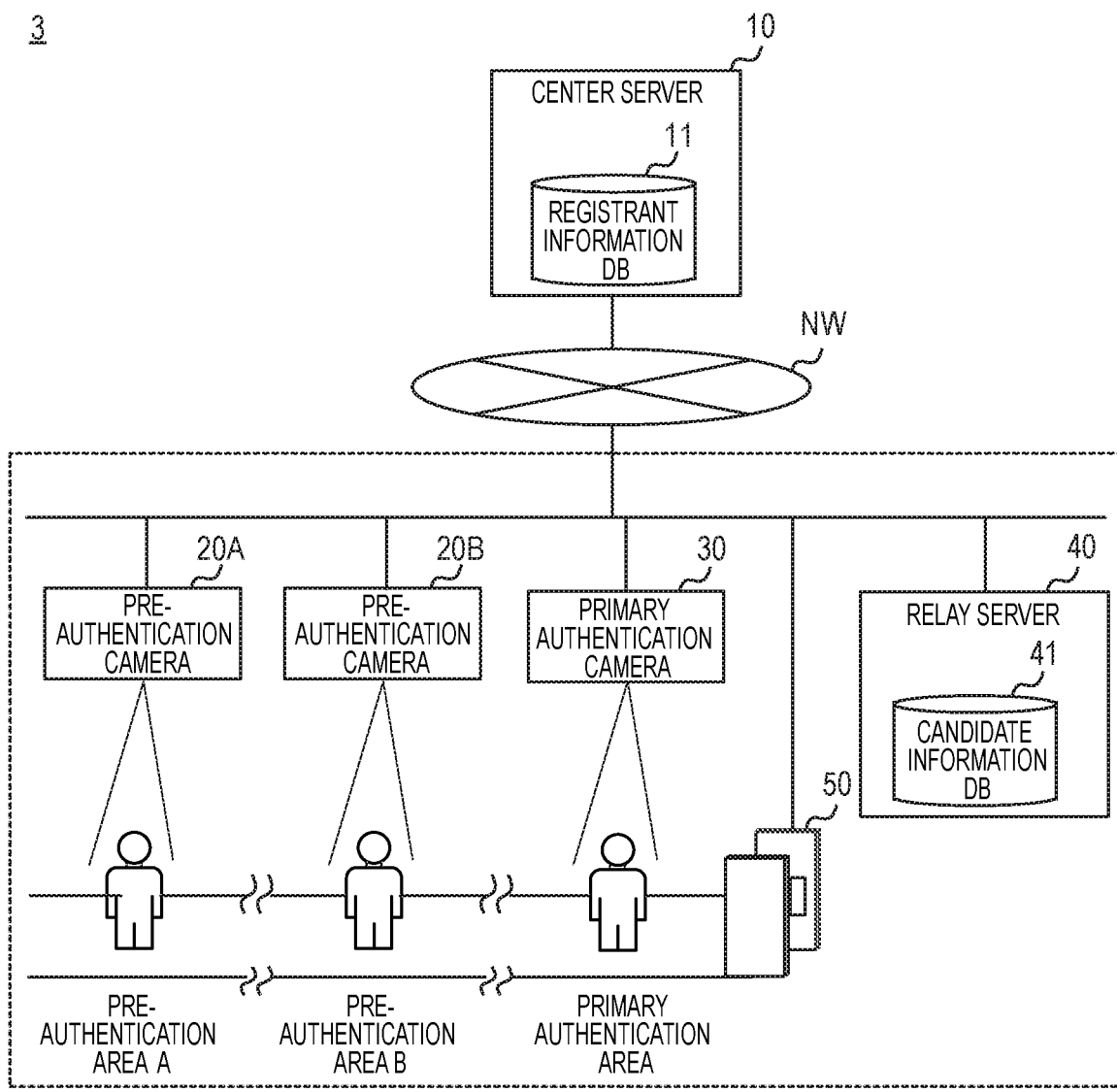
FIG. 12 is a diagram illustrating the entire configuration example of an information processing system in a third example embodiment.

FIG. 12 is a diagram illustrating the entire configuration example of the information processing system 3 in the present example embodiment. As illustrated in FIG. 12, the present example embodiment is different from the first example embodiment in that the pre-authentication areas are set in two regions and pre-authentication cameras 20A and 20B are installed in association with each area of pre-authentication areas A and B. Note that the pre-authentication areas may be set to three or more regions.

Figure 13:
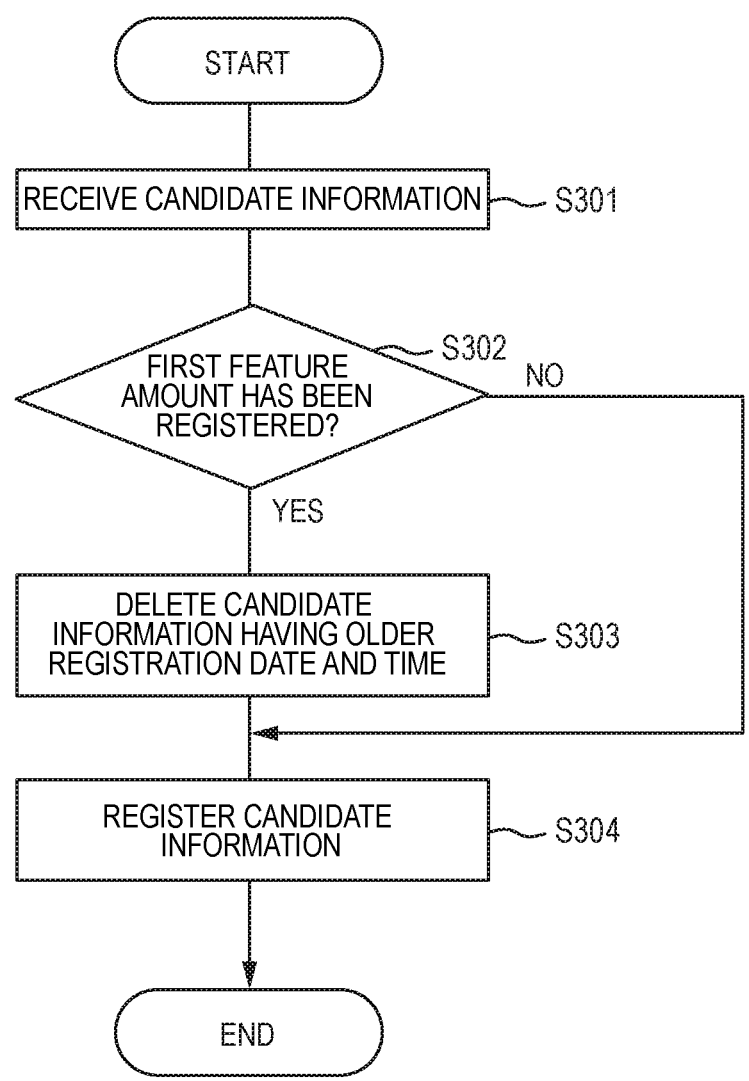
FIG. 13 is a flowchart illustrating one example of the process in a relay server in the third example embodiment.

Next, the effect and advantage of the information processing system 3 in the present example embodiment will be described with reference to FIG. 13. FIG. 13 is a flowchart illustrating one example of the process in the relay server 40.

First, once the candidate information acquisition unit 401 of the relay server 40 receives candidate information from the center server 10 (step S301), the candidate information acquisition unit 401 references the candidate information database 41 (the second storage unit 402) and determines whether or not the first feature amount included in the candidate information is a registered feature amount (step S302).

In this step, if the candidate information acquisition unit 401 of the relay server 40 determines that the first feature amount is a registered feature amount (step S302: YES), the candidate information deletion unit 408 of the relay server 40 deletes the registered candidate information whose registration date and time is old (step S303). The process then proceeds to step S304. On the other hand, if the candidate information acquisition unit 401 of the relay server 40 determines that the first feature amount is a non-registered feature amount (step S302: NO), the process proceeds to step S304.

In step S304, the candidate information acquisition unit 401 registers the candidate information received in step S301 in the candidate information database 41 and ends the process. Note that, while duplication is determined in accordance with whether or not a feature amount has been registered in the determination process in step S302 described above, the determination method is not limited thereto. For example, when a registrant ID is associated with a feature amount and stored in the candidate information database 41, it is possible to detect and delete duplicated candidate information based on the registrant ID.

In the information processing system 3 in the present example embodiment, a person is detected from captured images in the plurality of pre-authentication areas A and B and transmitted from the center server 10 to the relay server 40 as candidate information, respectively. In such a case, the candidate information may be transmitted multiple times for the same person. However, since control is performed so that duplicated identical feature amounts are not present in the candidate information database 41, it is possible to prevent unnecessary candidate information from being accumulated. As a result, it is possible to prevent a reduction in authentication accuracy and authentication speed in 1-to-N face recognition.

Fourth Example Embodiment

An information processing system 4 in a fourth example embodiment will be described below. Note that references common to references provided in the drawings of the first example embodiment denote the same object. Thus, the description of a part common to the first example embodiment will be omitted, and a different part will be described in detail.

Figure 14:
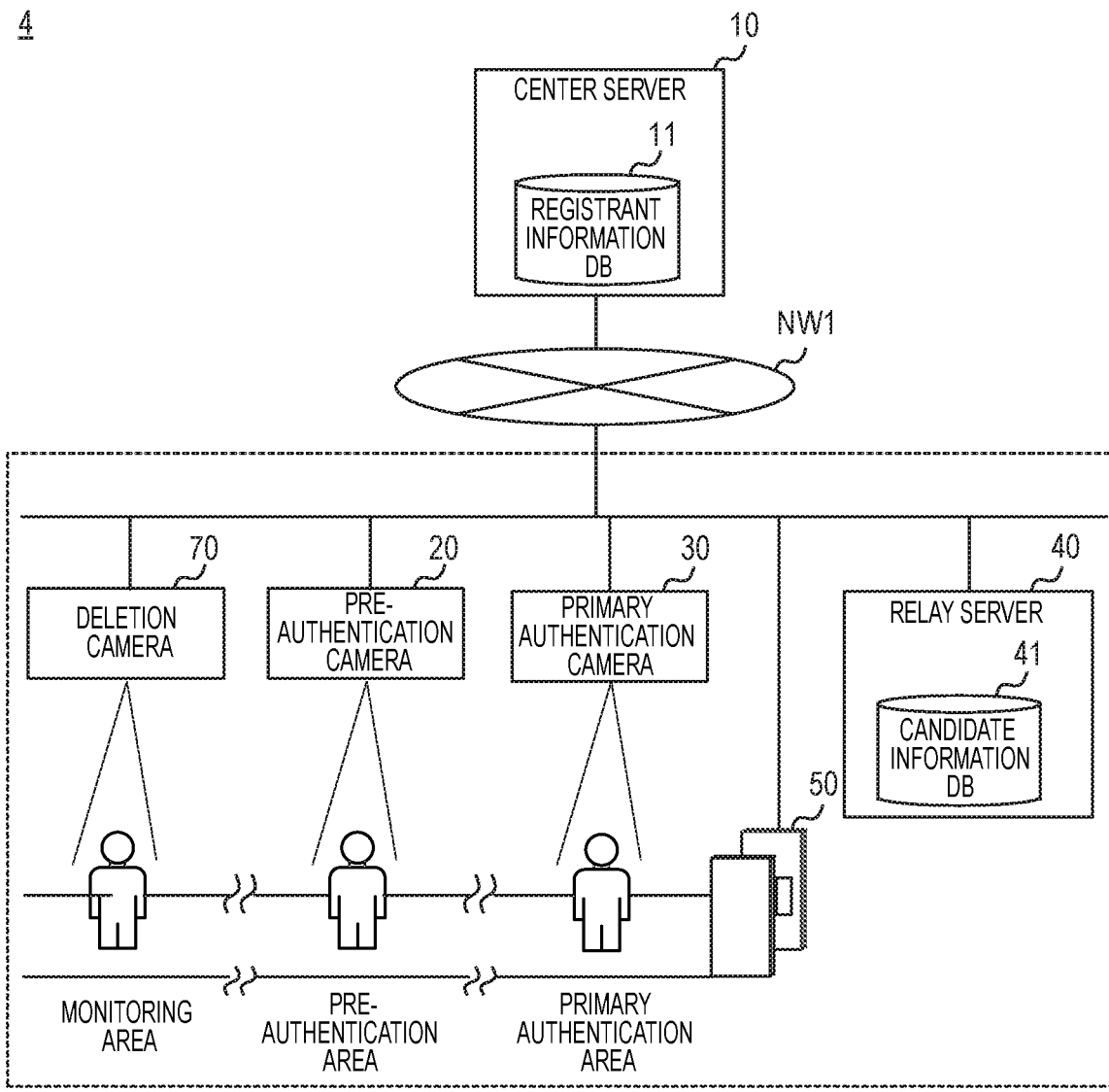
FIG. 14 is a diagram illustrating the entire configuration example of an information processing system in a fourth example embodiment.

FIG. 14 is a diagram illustrating the entire configuration example of the information processing system 4 in the present example embodiment. As illustrated in FIG. 14, the information processing system 4 is different from that of the first example embodiment in that a deletion camera 70 is installed independently of the pre-authentication camera 20 and the primary authentication camera 30 within a base. The deletion camera 70 is an image capture device (third camera) that captures a predetermined monitoring area.

While the case where the monitoring area is a different region from the pre-authentication area is illustrated as an example in FIG. 14, the monitoring area may be set to the same region as the pre-authentication area. That is, the deletion camera 70 (A) may be installed at a position more distant than the pre-authentication area from the primary authentication area as illustrated in FIG. 14 or (B) may be installed so as to face the pre-authentication camera 20 about the primary authentication area (primary authentication camera 30) as the center, for example. Thereby, based on the orientation of a face or a traveling direction of a person, it can be easily determined whether the person is moving toward the restricted area or is moving away from the restricted area. The relay server 40 (the candidate information deletion unit 408) then deletes candidate information from the candidate information database 41 for a person moving away from the restricted area.

Figure 15:
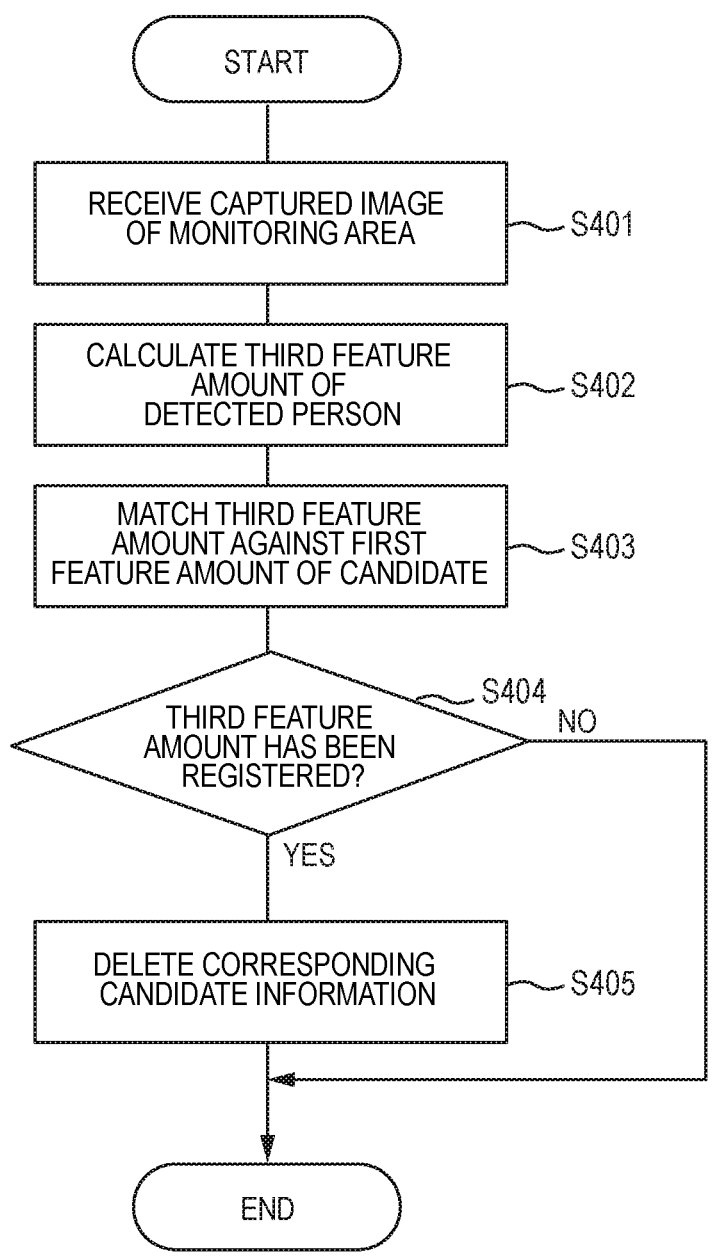
FIG. 15 is a flowchart illustrating one example of the process in a relay server in the fourth example embodiment.

Next, the effect and advantage of the information processing system 4 in the present example embodiment will be described with reference to FIG. 15. FIG. 15 is a flowchart illustrating one example of the process in the relay server 40 in the present example embodiment.

First, in response to receiving a captured image (third image) of a monitoring area from the deletion camera 70 (step S401), the relay server 40 calculates a third feature amount of a detected person (third person) included in the captured image (step S402). Next, the relay server 40 matches the calculated third feature amount against the first feature amount of a candidate (step S403).

Next, the relay server 40 references the candidate information database 41 and determines whether or not the third feature amount is a registered feature amount (step S404). In this step, if the relay server 40 determines that the third feature amount is a registered feature amount (step S404: YES), the candidate information deletion unit 408 of the relay server 40 deletes the registered candidate information (step S405) and ends the process.

On the other hand, if the relay server 40 determines that the third feature amount is a non-registered feature amount (step S404: NO), the process ends. No registration of candidate information is performed from a captured image in the monitoring area. However, when the third feature amount is a non-registered feature amount, the captured image or the third feature amount may be transmitted to the center server 10 as with the first feature amount.

When candidate information on a person included in a captured image of a predetermined monitoring area has been registered, the information processing system 4 in the present example embodiment can delete the candidate information. Thereby, since candidate information on persons who are out of consideration in the primary authentication can be appropriately arranged, it is possible to prevent unnecessary candidate information from being accumulated. As a result, it is possible to prevent a reduction in authentication accuracy and authentication speed in 1-to-N face recognition.

Fifth Example Embodiment

An information processing system 5 in a fifth example embodiment will be described below. Note that references common to references provided in the drawings of the first example embodiment denote the same object. Thus, the description of a part common to the first example embodiment will be omitted, and a different part will be described in detail.

Figure 16:
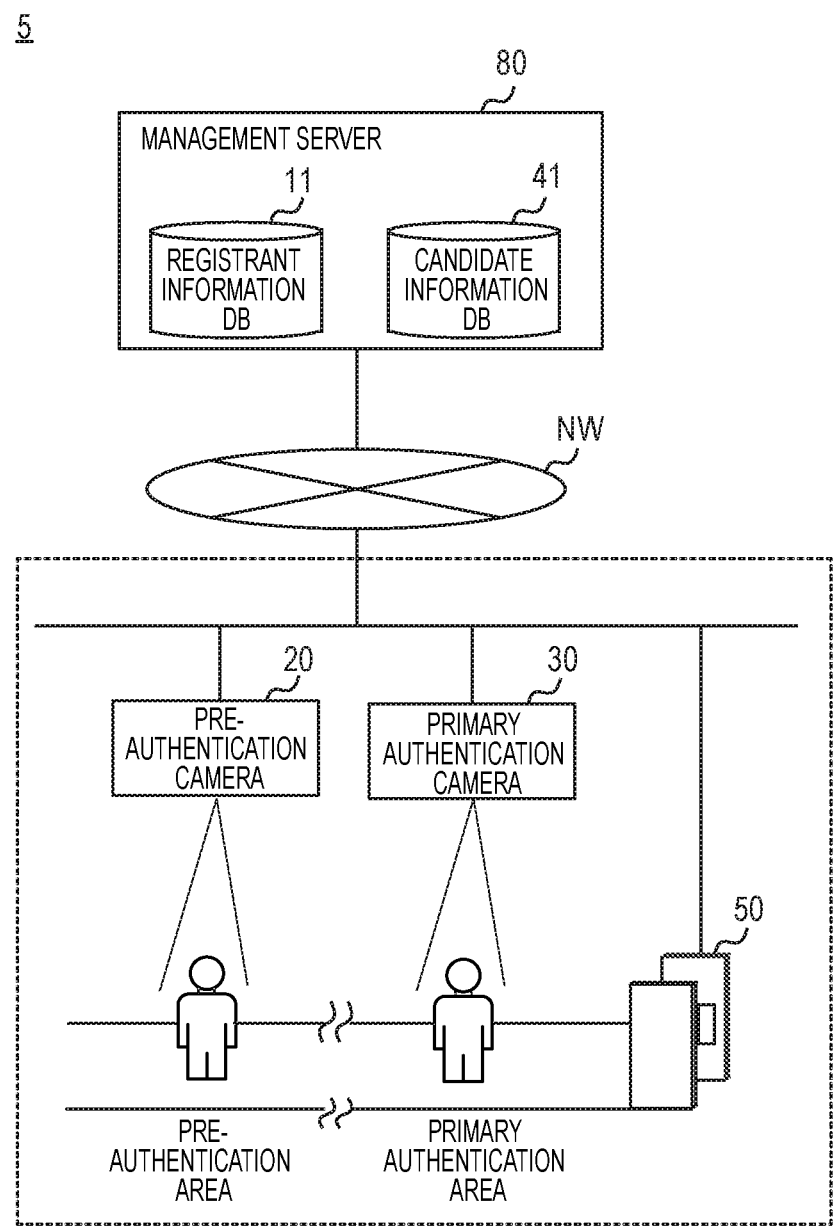
FIG. 16 is a functional block diagram of an information processing system in a fifth example embodiment.

FIG. 16 is a diagram illustrating the entire configuration example of the information processing system 5 in the present example embodiment. As illustrated in FIG. 16, the information processing system 5 is different from the first example embodiment in that, instead of the center server 10 and the relay server 40, a management server 80 in which the center server 10 and the relay server 40 are integrated is provided.

The management server 80 has the same function as the center server 10 and the relay server 40 illustrated in FIG. 4. Specifically, the management server 80 has both the registrant information database 11 (the first storage unit 101) and the candidate information database 41 (the second storage unit 402). Note that the function of transmitting and receiving information between servers is unnecessary due to the integration.

Figure 17:
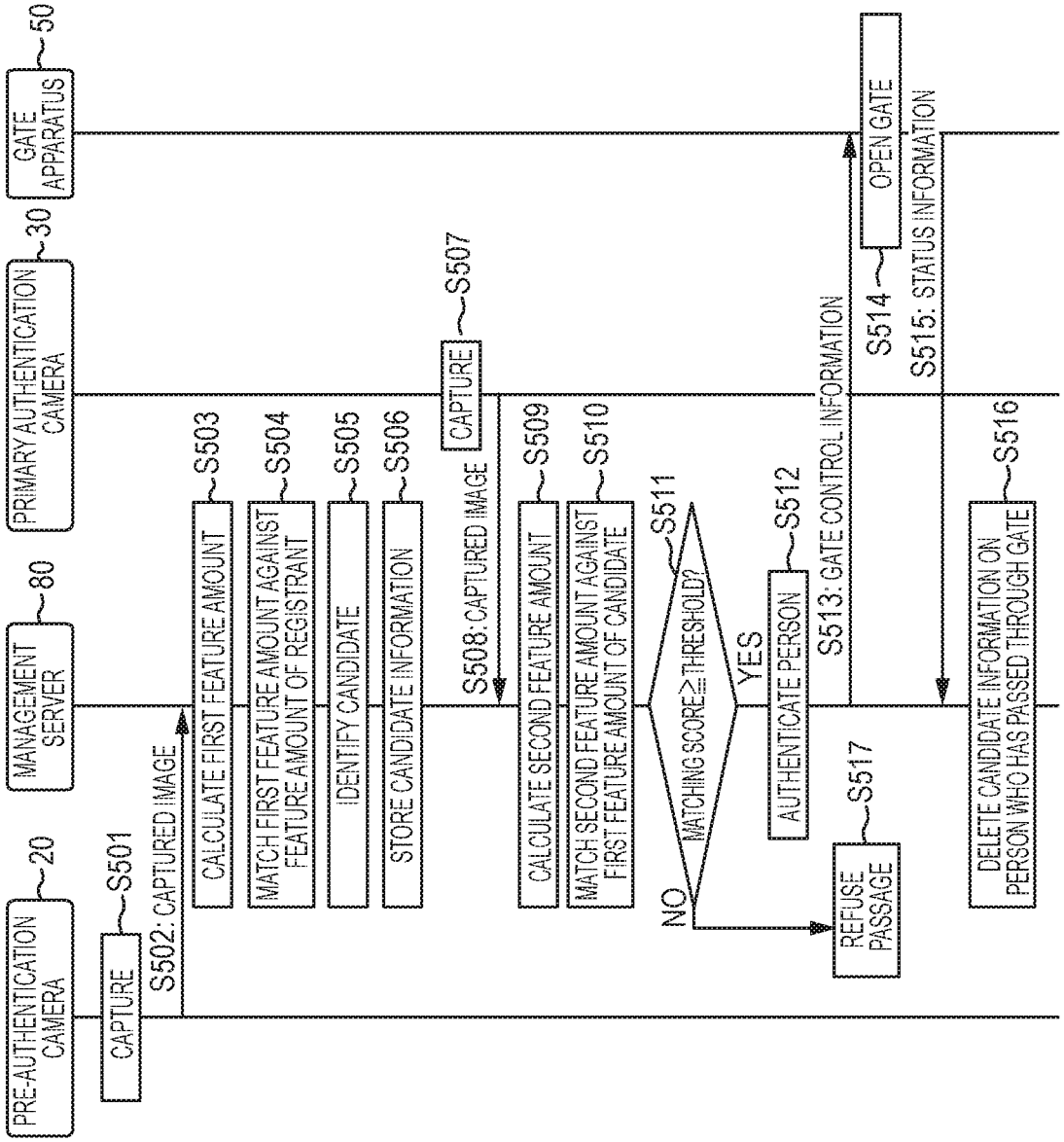
FIG. 17 is a sequence diagram illustrating one example of the process in the information processing system in the fifth example embodiment.

Next, the effect and advantage of the information processing system 5 in the present example embodiment will be described with reference to FIG. 17. FIG. 17 is a sequence diagram illustrating one example of the process in the information processing system 5 in the present example embodiment.

First, the pre-authentication camera 20 captures the pre-authentication area (step S501) and transmits the captured image (first image) to the management server 80 (step S502). Next, the management server 80 calculates the first feature amount of a detected person (first person) included in a captured image received from the pre-authentication camera 20 (step S503).

Next, the management server 80 matches the first feature amount of the detected person against feature amounts of registrants stored in the registrant information database 11 (step S504). Next, the management server 80 identifies, from the registrants having a matching score between feature amounts that is greater than or equal to a threshold, a registrant having the highest matching score between the feature amounts as a candidate (step S505). Note that the number of candidates matched and identified by the management server 80 is not limited to one. When a plurality of persons have the matching score greater than or equal to the predetermined threshold (determination reference value), the plurality of persons may be identified.

Next, the management server 80 stores the candidate information on the person identified from the registrants by the matching process in the candidate information database 41 (step S506).

The primary authentication camera 30 captures a primary authentication area (step S507) and transmits the captured image (second image) to the management server 80 (step S508). Next, when the management server 80 calculates a second feature amount of the detected person (second person) included in the captured image received from the primary authentication camera 30 (step S509), the management server 80 matches the second feature amount against each of the first feature amounts of candidates (step S510).

Next, the management server 80 determines whether or not the matching score between the second feature amount of the detected person and each of the first feature amounts of the candidates is greater than or equal to a predetermined threshold (determination reference value) (step S511). In this step, if the management server 80 determines that the matching score between the feature amounts is greater than or equal to the threshold (step S511: YES), the management server 80 identifies a candidate having the highest matching score out of the relevant registrants and authenticates the detected person (step S512). The management server 80 then transmits gate control information to the gate apparatus 50 (step S513).

The gate apparatus 50 opens the gate based on the gate control information received from the management server 80 (step S514) and, in response, transmits status information indicating the completion of gate opening to the management server 80 (step S515). The process then proceeds to step S516.

If the management server 80 determines that the matching score is less than the predetermined threshold (step S511: NO), the management server 80 performs determination on the second person as to refuse passage (step S517) and ends the process.

In step S516, the management server 80 deletes, from the candidate information database 41, candidate information related to a person who has passed through the gate and ends the process.

The information processing system 5 in the present example embodiment is configured such that, unlike the first example embodiment described above, the management server 80 has the functions of a plurality of servers and thus has an advantage that transmission and reception of data between servers are no longer necessary in addition to the advantages of the first example embodiment described above.

Sixth Example Embodiment

An information processing system 6 in a sixth example embodiment will be described below. Note that references common to references provided in the drawings of the second example embodiment denote the same object. Thus, the description of a part common to the second example embodiment will be omitted, and a different part will be described in detail.

Figure 18:
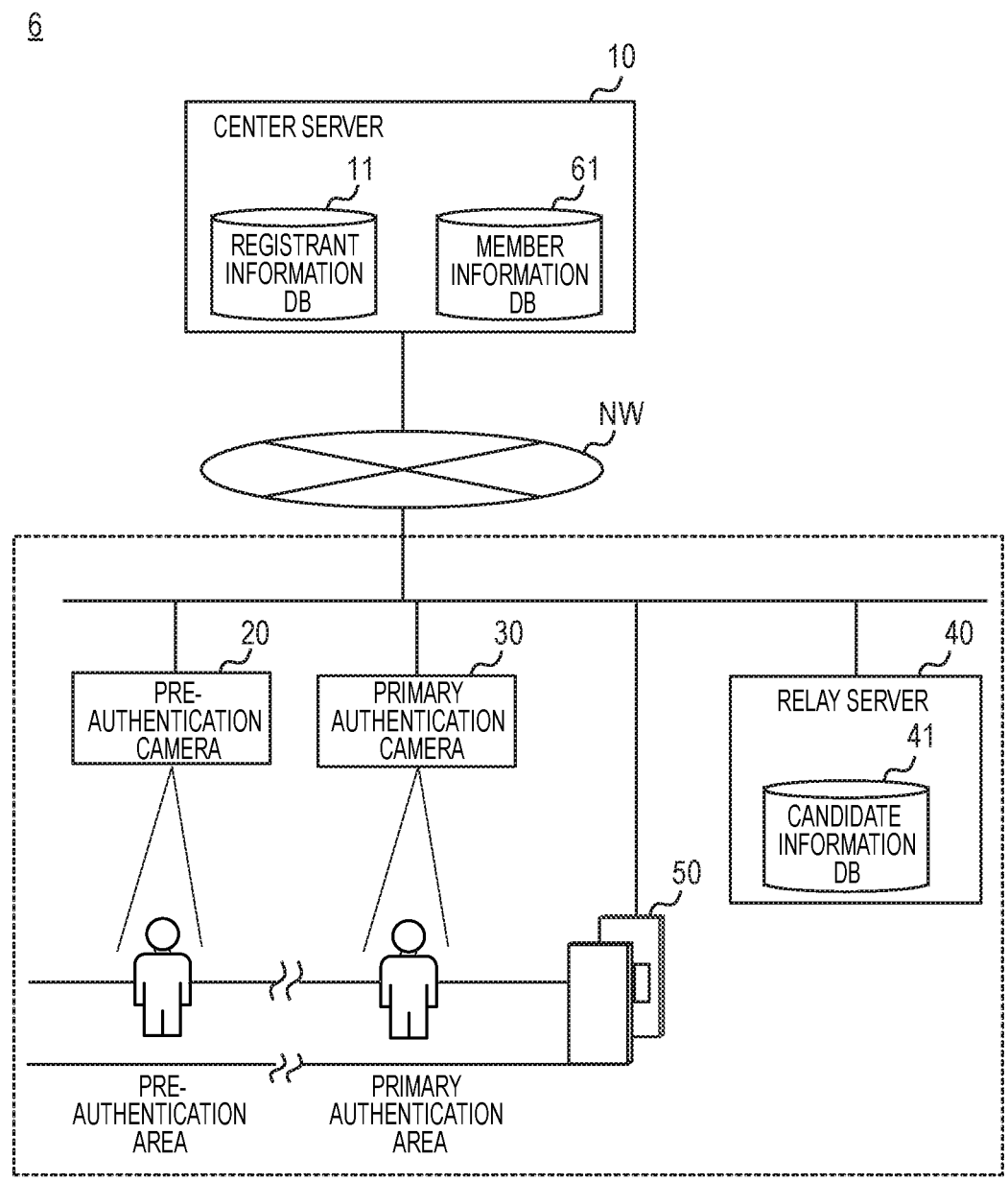
FIG. 18 is a diagram illustrating the entire configuration example of an information processing system in a sixth example embodiment.

FIG. 18 is a diagram illustrating the entire configuration example of the information processing system 6 in the present example embodiment. As illustrated in FIG. 18, the center server 10 is different from that of the second example embodiment in that the member information database 61 is provided in addition to the registrant information database 11. That is, the center server 10 of the present example embodiment further has the function of the external server 60 of the second example embodiment. Note that, in the present example embodiment, the member information database 61 is not required to have all the data items illustrated in FIG. 10, and the data item ("name", "address", or the like) duplicated with the registrant information database 11 may be omitted. Further, the registrant information database 11 and the member information database 61 may be aggregated into a single database.

Figure 19:
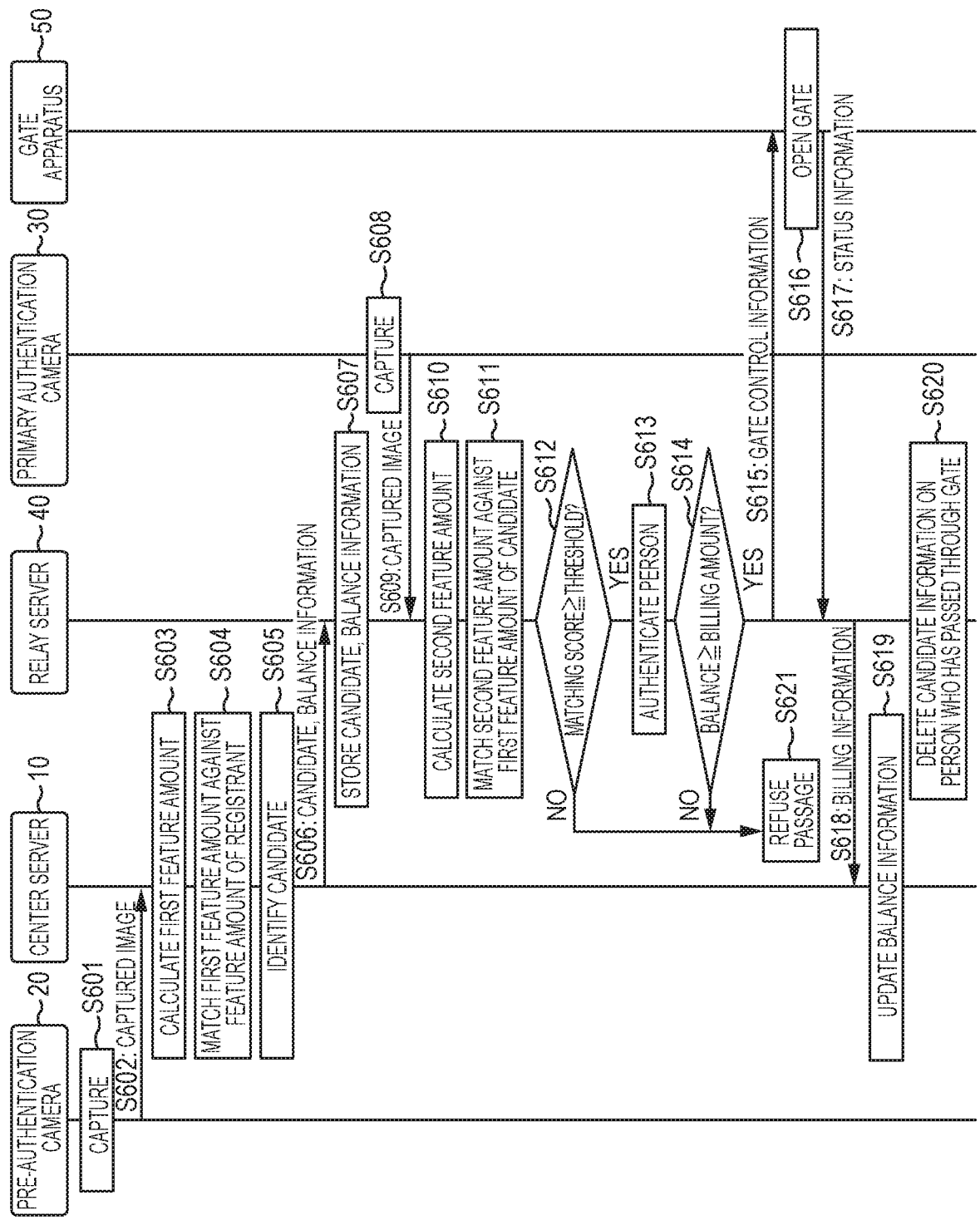
FIG. 19 is a sequence diagram illustrating one example of the process in the information processing system in the sixth example embodiment.

Next, the effect and advantage of the information processing system 6 in the present example embodiment will be described with reference to FIG. 19. FIG. 19 is a sequence diagram illustrating one example of the process in the information processing system 6.

First, the pre-authentication camera 20 captures a pre-authentication area (step S601) and transmits the captured image to the center server 10 (step S602). Next, when the first image acquisition unit 102 of the center server 10 receives the captured image from the pre-authentication camera 20, the first feature amount calculation unit 103 calculates a first feature amount of a detected person (first person) included in the received captured image (step S603).

Next, the first matching unit 104 of the center server 10 matches the first feature amount of the detected person against feature amounts of registrants stored in the registrant information database 11 (step S604). If a matching score between the first feature amount of the detected person and each of the feature amounts of registrants is greater than or equal to a predetermined threshold (determination reference value), the first matching unit 104 identifies, from the registrants, a registrant having the highest matching score as a candidate (step S605). Note that the number of candidates matched and identified by the center server 10 is not limited to one. When a plurality of persons have the matching score greater than or equal to the predetermined threshold (determination reference value), the plurality of persons may be identified.

Next, the candidate information output unit 105 of the center server 10 transmits the feature amount of candidates identified from the registrants by the matching process (candidate information) and balance information on the candidates to the relay server 40 (step S606). The balance information on the candidate can be acquired from member information having a member ID that matches a registrant ID of a candidate by searching the member information database 61 by using the registrant ID as a search key. Next, the candidate information acquisition unit 401 of the relay server 40 stores the candidate information and the balance information received from the center server 10 in the candidate information database 41 that is the second storage unit 402 (step S607).

The primary authentication camera 30 captures a primary authentication area (step S608) and transmits the captured image to the relay server 40 (step S609). Next, when the second image acquisition unit 403 of the relay server 40 receives the captured image from the primary authentication camera 30, the second feature amount calculation unit 404 calculates a second feature amount of the detected person (second person) included in the received captured image (step S610). The second matching unit 405 of the relay server 40 then matches the second feature amount against each of the first feature amounts of candidates (step S611).

Next, the determination unit 406 of the relay server 40 determines whether or not the matching score between the second feature amount of the detected person and each of the first feature amounts of the candidates is greater than or equal to a predetermined threshold (determination reference value) (step S612). In this step, if the determination unit 406 of the relay server 40 determines that the matching score between the feature amounts is greater than or equal to the threshold (step S612: YES), the determination unit 406 identifies a candidate having the highest matching score between the feature amounts out of the relevant persons and authenticates the detected person (step S613). The process then proceeds to step S614.

If the determination unit 406 of the relay server 40 determines that the matching score between the feature amounts is less than the threshold (step S612: NO), the determination unit 406 performs determination on the second person as to refuse passage (step S621) and ends the process.

In step S614, the determination unit 406 of the relay server 40 references the balance information on the first person stored in the candidate information database 41 and determines whether or not the balance is greater than or equal to a billing amount. In this step, if the determination unit 406 of the relay server 40 determines that the balance is greater than or equal to the billing amount (step S614: YES), the gate control unit 407 of the relay server 40 transmits gate control information to the gate apparatus 50 (step S615).

The gate apparatus 50 opens the gate based on the gate control information received from the relay server 40 (step S616) and, in response, transmits status information indicating the completion of gate opening to the relay server 40 (step S617).

Further, in parallel to the process of steps S615 to S617, the relay server 40 transmits billing information to the center server 10 (step S618). In response to this billing information, the center server 10 updates the balance information included in the member information in the member information database 61 (step S619).

If the determination unit 406 of the relay server 40 determines that the balance is less than the billing amount (step S614: NO), the determination unit 406 performs determination on the second person as to refuse passage (step S621) and ends the process. In this case, a closed state (initial state) is maintained at the gate apparatus 50.

In step S620, the candidate information deletion unit 408 of the relay server 40 deletes, from the candidate information database 41, candidate information related to a person who has passed through the gate and ends the process. Note that, while the process of comparing a balance with a billing amount (step S614) is performed after the process of determining a matching score between the first feature amount and the second feature amount (step S612) in the sequence diagram of FIG. 19, the order of the processes is not limited thereto. For example, the process of comparing a balance with a billing amount of a registrant (candidate) (step S614) may be performed immediately after the relay server 40 stores balance information received from the center server 10 in the candidate information database 41. In such a case, when the relay server 40 determines that the balance is less than the billing amount, it is preferable to further perform a process to delete, from the candidate information database 41, the candidate information corresponding to the candidate with an insufficient balance. Once the corresponding candidate information is deleted from the relay server 40, the relay server 40 determines that there is no candidate information in which the matching score is greater than or equal to a threshold in the subsequent determination process (corresponding to step S612). Thus, in the same manner as FIG. 19, the relay server 40 is able to refuse passage by a registrant with an insufficient balance.

The information processing system 6 in the present example embodiment is configured to determine whether or not to permit passage to the restricted area by taking into consideration of not only a matching result of face feature amounts but also balance information on a candidate and thus can determine a person who is allowed to use a service. Further, since the relay server 40 has balance information on a candidate before capturing the candidate by the primary authentication camera 30 installed near the gate apparatus 50, the relay server 40 can immediately open the gate when determining that the matching score between the second feature amount of the captured image captured by the primary authentication camera 30 and the first feature amount is greater than or equal to a threshold. Furthermore, the information processing system 6 in the present example embodiment is configured such that, unlike the second example embodiment described above, the center server 10 has both the registrant information database 11 and the member information database 61 and thus has also an advantage that it is possible to acquire balance information on a registrant without performing an authentication process for the external server.

Seventh Example Embodiment

Figure 20:
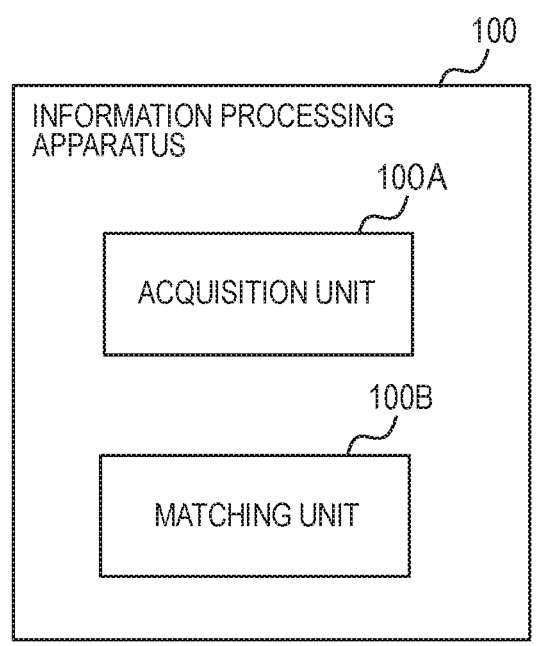
FIG. 20 is a functional block diagram of an information processing apparatus in a seventh example embodiment.

FIG. 20 is a functional block diagram of an information processing apparatus 100 in a seventh example embodiment. As illustrated in FIG. 20, the information processing apparatus 100 has an acquisition unit 100A and a matching unit 100B. The acquisition unit 100A acquires, from a registered biometrics information group including biometrics information on a plurality of registrants, a first biometrics information group including biometrics information on a first person detected from a first image captured in a first area. The matching unit 100B matches biometrics information on a second person detected from a second image captured in a second area that is different from the first area against the biometrics information included in the first biometrics information group. The information processing apparatus 100 in the present example embodiment can improve the authentication accuracy and the authentication speed in face recognition.

Eighth Example Embodiment

Figure 21:
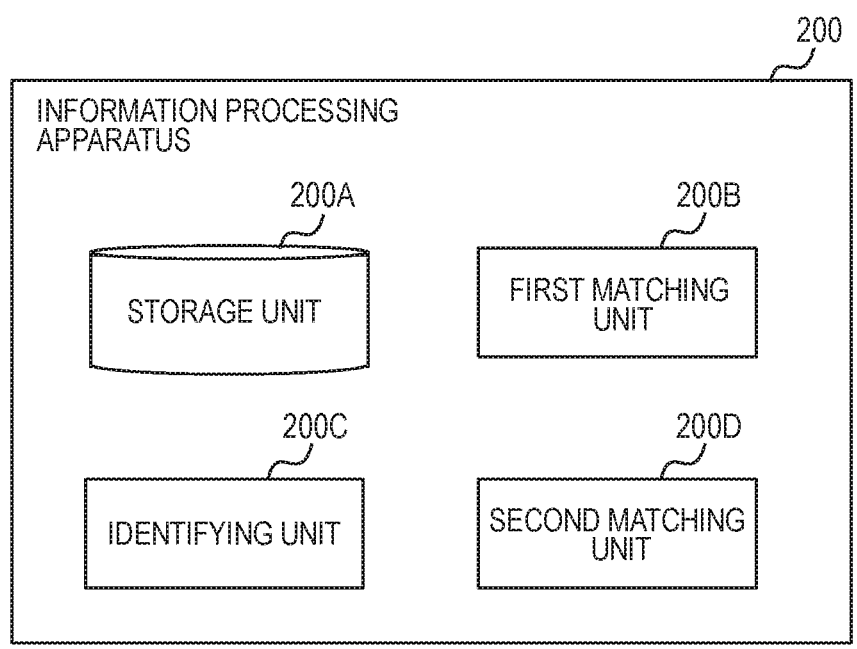
FIG. 21 is a functional block diagram of an information processing apparatus in an eighth example embodiment.

FIG. 21 is a functional block diagram of an information processing apparatus 200 in an eighth example embodiment. As illustrated in FIG. 21, the information processing apparatus 200 has a storage unit 200A, a first matching unit 200B, an identifying unit 200C, and a second matching unit 200D. The storage unit 200A stores a registered biometrics information group including biometrics information on a plurality of registrants. The first matching unit 200B matches biometrics information on a first person detected from a first image captured in a first area against biometrics information included in the registered biometrics information group. The identifying unit 200C identifies a first biometrics information group including biometrics information on the first person from the registered biometrics information group based on a matching result in the first matching unit 200B. The second matching unit 200D matches biometrics information on a second person detected from a second image captured in a second area that is different from the first area against biometrics information included in the first biometrics information group. The information processing apparatus 200 in the present example embodiment can improve the authentication accuracy and the authentication speed in face recognition.

Ninth Example Embodiment

Figure 22:
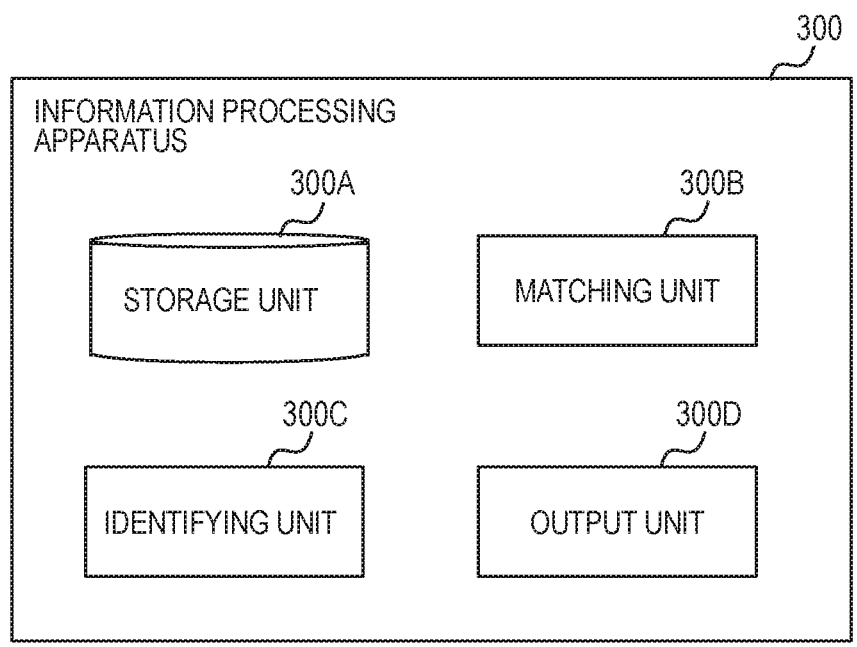
FIG. 22 is a functional block diagram of an information processing apparatus in a ninth example embodiment.

FIG. 22 is a functional block diagram of an information processing apparatus 300 in a ninth example embodiment. As illustrated in FIG. 22, the information processing apparatus 300 has a storage unit 300A, a matching unit 300B, an identifying unit 300C, and an output unit 300D. The storage unit 300A stores a registered biometrics information group including biometrics information on a plurality of registrants. The matching unit 300B matches biometrics information on a first person detected from a first image captured in a first area against biometrics information included in the registered biometrics information group. The identifying unit 300C identifies a first biometrics information group including biometrics information on the first person from the registered biometrics information group based on a matching result in the matching unit 300B. The output unit 300D outputs the first biometrics information group used for a matching operation of biometrics information on a second person detected in a second area that is different from the first area. The information processing apparatus 300 in the present example embodiment can improve the authentication accuracy and the authentication speed in face recognition.

Tenth Example Embodiment

Figure 23:
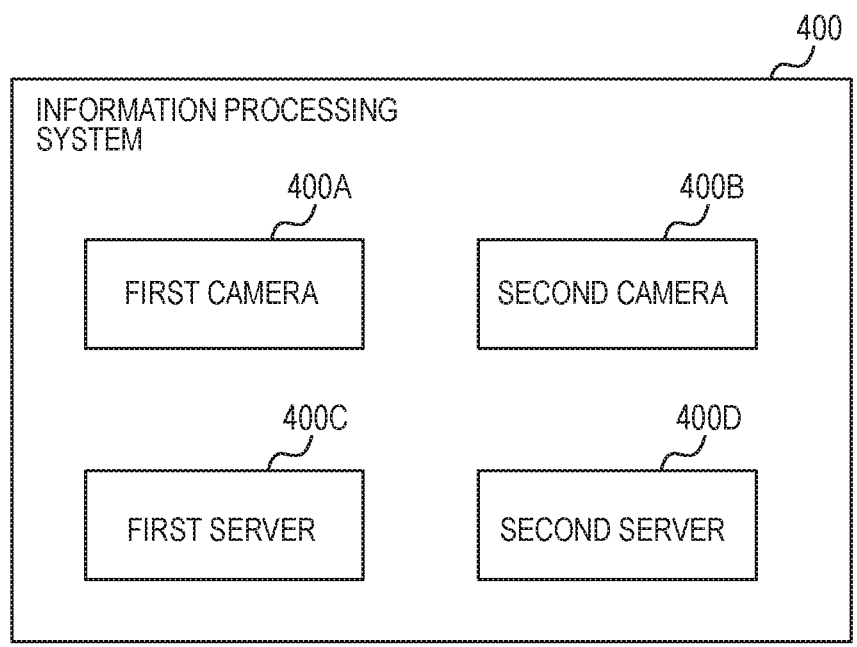
FIG. 23 is a functional block diagram of an information processing system in a tenth example embodiment.

FIG. 23 is a functional block diagram of an information processing system 400 in a tenth example embodiment. As illustrated in FIG. 23, the information processing system 400 has a first camera 400A, a second camera 400B, a first server 400C, and a second server 400D. The first camera 400A captures a first area to generate a first image. The second camera 400B captures a second area that is different from the first area to generate a second image. The first server 400C matches biometrics information on a first person detected from the first image against a registered biometrics information group including biometrics information on a plurality of registrants and identifies a first biometrics information group including biometrics information on the first person from the registered biometrics information group. The second server 400D matches biometrics information on a second person detected from the second image against biometrics information included in the first biometrics information group. The information processing system 400 in the present example embodiment can improve the authentication accuracy and the authentication speed in face recognition.

Modified Example Embodiments

The present invention can be appropriately changed within the scope not departing from the spirit of the present invention without being limited to the example embodiments described above.

While the case where it is determined whether or not a detected person is authorized for passage based on a matching result of feature amounts has been described in the above first example embodiment, a result of determination obtained by a predetermined authentication card (for example, a security card, a transportation IC card, or the like) may be used together with the matching result of feature amounts.

Figure 24:
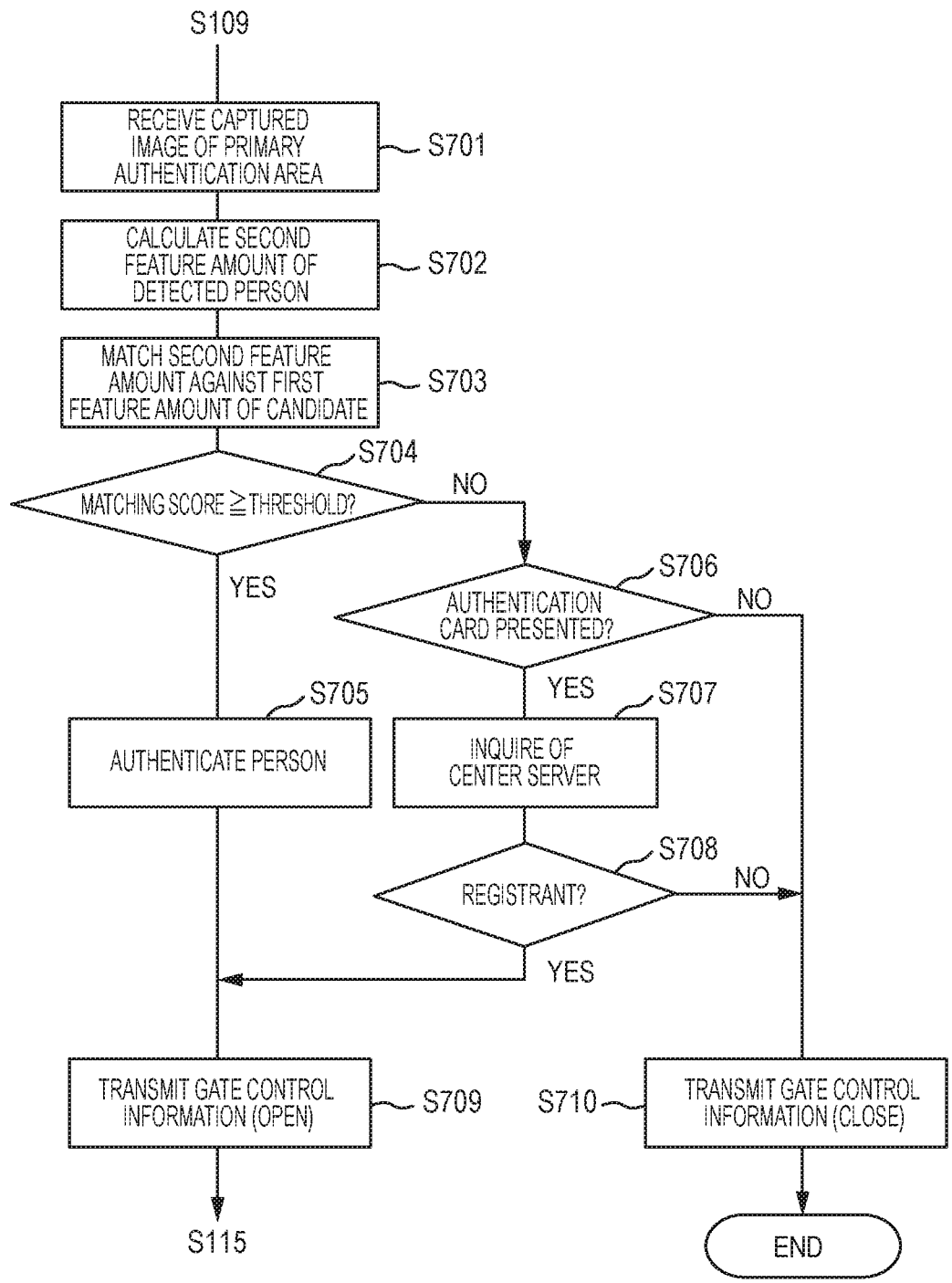
FIG. 24 is a flowchart illustrating one example of the process of a relay server in a modified example embodiment.

FIG. 24 is a flowchart illustrating one example of the process in the relay server 40 in the modified example embodiment. This process is performed between step S109 and step S115 of FIG. 7.

First, the relay server 40 receives a captured image of a primary authentication area (step S701) and, in response, calculates a second feature amount of a detected person included in the captured image (step S702). Next, the relay server 40 matches the calculated second feature amount against a first feature amount of a candidate (step S703).

Next, the relay server 40 determines whether or not a matching score between the second feature amount of the detected person and the first feature amount of the candidate is greater than or equal to a predetermined threshold (determination reference value) (step S704). In this step, if the relay server 40 determines that the matching score is greater than or equal to the threshold (step S704: YES), the relay server 40 identifies a person having the highest matching score between the feature amounts out of the relevant candidates (step S705). Thereby, the identified candidate (registrant) and the detected person are considered as the identical person. The process then proceeds to step S709. On the other hand, if the relay server 40 determines that the matching score is less than the threshold (step S704: NO), the process proceeds to step S706.

In step S706, the relay server 40 determines whether or not an authentication card is presented from the detected person in the primary authentication area (hereafter, referred to as "authentication subject"). In this step, if the relay server 40 determines that an authentication card is presented (step S706: YES), the process proceeds to step S707. On the other hand, if the relay server 40 determines that no authentication card is presented (step S706: NO), the process proceeds to step S710.

In step S707, the relay server 40 inquires of the center server 10 whether or not the authentication subject is a registrant based on authentication information read from the authentication card by a card reader device (not illustrated). Next, the relay server 40 determines whether or not the authentication subject is a registrant based on response information from the center server 10 (step S708). In this step, if the relay server 40 determines that the authentication subject is a registrant (step S708: YES), the process proceeds to step S709. On the other hand, if the relay server 40 determines that the authentication subject is not a registrant (step S708: NO), the process proceeds to step S710.

In step S709, when the relay server 40 transmits gate control information of a gate open instruction to the gate apparatus 50, the process proceeds to step S115. On the other hand, in step S710, when the relay server 40 transmits gate control information of a gate closure instruction to the gate apparatus 50, the process ends. In such a way, by combining authentication using face recognition and authentication using an authentication card, it is also possible to support a registrant whose face image is not registered.

Further, while the management server 80 has both the registrant information database 11 (the first storage unit 101) and the candidate information database 41 (the second storage unit 402) in the fifth example embodiment described above, these databases may be aggregated into a single database. FIG. 25 is a diagram illustrating one example of registrant information stored in the management server 80 in the modified example embodiment. In this example, "candidate flag" is added to the data item of the registrant information illustrated in FIG. 5. The candidate flag has the initial value "0" and is updated to "1" when a registrant is identified as a candidate based on a matching result in the pre-authentication area. Then, upon the completion of the matching operation, the candidate flag returns to the initial value "0". That is, candidate information is defined in the registrant information. Thus, by matching a second feature amount of a detected person included in a captured image of the primary authentication area against a feature amount (first feature amount) of a registrant whose candidate flag is "1", it is possible to obtain the same advantage as that in the fifth example embodiment described above.

Further, it has been described in the above example embodiments that candidate information is deleted in accordance with three types of deletion conditions, namely, (A) when an authentication subject has passed through the gate apparatus 50, (B) when candidate information related to a registered feature amount is again received, and (C) when candidate information on a person included in a captured image of a monitoring area has been registered, but the deletion condition is not limited thereto. For example, candidate information may be deleted based on whether or not elapsed time from registration date and time of candidate information (DB registration time) to the current time reaches predetermined time. In such a case, it is possible to prevent candidate information which is no longer necessary due to time elapsing from remaining in the candidate information database 41.

Further, in each of the example embodiments described above, the case where the pre-authentication camera 20 and the primary authentication camera 30 have only the function of transmitting a captured image has been described. However, the pre-authentication camera 20 and the primary authentication camera 30 may further have a function of detecting a person from a captured image and calculating and transmitting the feature amount thereof. In such a case, it is possible to require only the transmission of the feature amount instead of a captured image to the center server 10 or the relay server 40.

Further, while the case where the center server 10 transmits only the face feature amount to the relay server has been described in each of the above example embodiments, a face image of an identified candidate may be transmitted, or an ID of a candidate may be transmitted together with a feature amount or a face image. When a face image is transmitted, it is also possible to create passage history information including a face image of a matched candidate and a face image of the second person. Further, when an ID of a candidate (registrant ID) is transmitted together and held on the relay server 40 side with a feature amount and the ID being associated with each other, it is possible to extract and delete duplicated candidate information based not only on a matching operation of feature amounts but also on a matching result of the IDs.

Further, while the case where a single relay server 40 is installed to a single base has been described in the above first to fourth example embodiments, a plurality of relay servers 40 may be installed to a single base. For example, in a facility in which the number of users is extremely large, installation of the plurality of relay servers 40 provides an advantage that a matching process may be performed in a distributed manner. In such a case, it is preferable to control data registration so that duplicated candidate information is not held between the plurality of relay servers 40.

Further, while the case where a threshold used at a matching operation in the pre-authentication area and a threshold used at a matching operation in the primary authentication area are the same value has been described in each of the above example embodiments, the threshold may be different for the pre-authentication area and the primary authentication area. For example, a threshold used at a matching operation in the pre-authentication area may be set to be lower than a threshold used at a matching operation in the primary authentication area. This has an advantage that incomplete extraction of candidates in the pre-authentication area can be prevented. In contrast, a threshold used at a matching operation in the pre-authentication area may be set to be higher than a threshold used at a matching operation in the primary authentication area. Thereby, pre-authentication can be performed under a stricter condition. Further, when a plurality of pre-authentication areas are set, thresholds used at matching operations in respective pre-authentication areas may be set such that a higher threshold is set for one closer to the primary authentication area (the primary authentication camera 30). Thereby, it is possible to narrow stepwise authentication subjects (candidates) in the primary authentication area in accordance with the distance from each of the pre-authentication areas to the primary authentication area.

Furthermore, in each of the above example embodiments, the case where candidate information (first feature amount) on the same person is not duplicated in registration even when the same person is detected multiple times in the pre-authentication area and the number of detection times is not considered has been described. However, when a plurality of pre-authentication cameras 20 are installed, the same person may be captured multiple times. Thus, when the same person is captured multiple times, the threshold used at a matching operation in the primary authentication area may be changed (increased or decreased) in accordance with the number of detection times. Thereby, for example, by increasing a threshold in the primary authentication area to be higher than that in a normal state for a person detected for a predetermined number of times or more in the pre-authentication area, it is possible to authenticate the person strictly as a suspicious person. In contrast, authentication may be performed by decreasing a threshold in the primary authentication area to be lower than that in a normal state.

The scope of each of the example embodiments further includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the program itself. Further, one or two or more components included in the example embodiments described above may be a circuit such as an ASIC, an FPGA, or the like configured to implement the function of each component.

As the storage medium, for example, a floppy (registered trademark) disk, a hard disk, an optical disk, a magneto-optical disk, a Compact Disk (CD)-ROM, a magnetic tape, a nonvolatile memory card, or a ROM can be used. Further, the scope of each of the example embodiments includes an example that operates on Operating System (OS) to perform a process in cooperation with another software or a function of an add-in board without being limited to an example that performs a process by an individual program stored in the storage medium.

Further, a service implemented by the function of each of the example embodiments described above may be provided to a user in a form of Software as a Service (SaaS).

Note that all the example embodiments described above are mere examples of embodiment in implementing the present invention, and the technical scope of the present invention should not be construed in a limiting sense by these example embodiments. That is, the present invention can be implemented in various forms without departing from the technical concept thereof or the primary feature thereof.

The whole or part of the example embodiments disclosed above can be described as, but not limited to, the following supplementary notes.

(Supplementary Note 1)

An information processing apparatus comprising:

an acquisition unit that acquires a first biometrics information group including biometrics information on a first person detected from a first image captured in a first area from a registered biometrics information group including biometrics information on a plurality of registrants; and a matching unit that matches biometrics information on a second person detected from a second image captured in a second area that is different from the first area against biometrics information included in the first biometrics information group.

(Supplementary Note 2)

The information processing apparatus according to supplementary note 1 further comprising a detection unit that detects biometrics information on the second person from the second image.

(Supplementary Note 3)

The information processing apparatus according to supplementary note 1 or 2 further comprising a determination unit that determines whether or not the second person is authorized for passage from the second area to a restricted area based on a matching result obtained by the matching unit.

(Supplemenary Note 4)

The information processing apparatus according to supplementary note 3 further comprising a control unit that controls opening or closing of a door of a passage restriction apparatus installed between the restricted area and the second area based on whether or not the second person is authorized for the passage.

(Supplemenary Note 5)

The information processing apparatus according to supplementary note 3 or 4 further comprising a balance information acquisition unit that acquires balance information on the first person, wherein the determination unit determines whether or not the second person is authorized for the passage to the restricted area based on the matching result and the balance information.

(Supplementary Note 6)

The information processing apparatus according to any one of supplementary notes 1 to 5 further comprising:

a storage unit that stores the acquired first biometrics information group; and a deletion unit that deletes, from the first biometrics information group, biometrics information on the first person that matches a predetermined condition.

(Supplementary Note 7)

The information processing apparatus according to supplementary note 6, wherein the deletion unit deletes biometrics information on the first person for which elapsed time from time of registration to the storage unit reaches predetermined time.

(Supplementary Note 8)

The information processing apparatus according to supplementary note 6 or 7, wherein the deletion unit deletes biometrics information on the first person from the storage unit when biometrics information on a third person detected from a third image captured in a predetermined monitoring area matches biometrics information on the first person.

(Supplementary Note 9)

The information processing apparatus according to any one of supplementary notes 6 to 8, wherein when there are multiple pieces of biometrics information for the first person in the storage unit, the deletion unit deletes biometrics information having earlier time of registration to the storage unit.

(Supplemenary Note 10)

An information processing apparatus comprising:

a storage unit that stores a registered biometrics information group including biometrics information on a plurality of registrants;

a first matching unit that matches biometrics information on a first person detected from a first image captured in a first area against biometrics information included in the registered biometrics information group;

an identifying unit that identifies a first biometrics information group including biometrics information on the first person from the registered biometrics information group based on a matching result in the first matching unit; and a second matching unit that matches biometrics information on a second person detected from a second image captured in a second area that is different from the first area against biometrics information included in the first biometrics information group.

(Supplementary Note 11)

An information processing apparatus comprising:

a storage unit that stores a registered biometrics information group including biometrics information on a plurality of registrants;

a matching unit that matches biometrics information on a first person detected from a first image captured in a first area against biometrics information included in the registered biometrics information group;

an identifying unit that identifies a first biometrics information group including biometrics information on the first person from the registered biometrics information group based on a matching result in the matching unit; and an output unit that outputs the first biometrics information group used for a matching operation of biometrics information on a second person detected in a second area that is different from the first area.

(Supplementary Note 12)

An information processing system comprising:

a first camera that captures a first area to generate a first image;

a second camera that captures a second area that is different from the first area to generate a second image;

a first server that matches biometrics information on a first person detected from the first image against a registered biometrics information group including biometrics information on a plurality of registrants and identifies a first biometrics information group including biometrics information on the first person from the registered biometrics information group; and a second server that matches biometrics information on a second person detected from the second image against biometrics information included in the first biometrics information group.

(Supplementary Note 13)

The information processing system according to supplementary note 12, wherein a reference value used for determining a matching in a matching operation of biometrics information on the first person against biometrics information on the registrants in the first server is set lower than a reference value used for determining a matching in a matching operation of biometrics information on the second person against biometrics information on the first person in the second server.

(Supplementary Note 14)

The information processing system according to supplementary note 12, wherein a reference value used for determining a matching in a matching operation of biometrics information on the first person against biometrics information on the registrants in the first server is set higher than a reference value used for determining a matching in a matching operation of biometrics information on the second person against biometrics information on the first person in the second server.

(Supplementary Note 15)

The information processing system according to any one of supplementary notes 12 to 14, wherein a reference value at a matching operation of biometrics information on the second person against biometrics information on the first person in the second area is determined in accordance with the number of times that the same person is detected in the first area.

(Supplementary Note 16)

An information processing method comprising:

acquiring a first biometrics information group including biometrics information on a first person detected from a first image captured in a first area from a registered biometrics information group including biometrics information on a plurality of registrants; and matching biometrics information on a second person detected from a second image captured in a second area that is different from the first area against biometrics information included in the first biometrics information group.

(Supplementary Note 17)

The information processing method according to supplementary note 16 further comprising:

detecting biometrics information on the second person from the second image.

(SUPPLEMENTARY NOTE 18)

The information processing method according to supplementary note 16 or 17 further comprising:

determining whether or not the second person is authorized for passage from the second area to a restricted area based on a matching result obtained by the matching.

(Supplementary Note 19)

The information processing method according to supplementary note 18 further comprising:

controlling opening or closing of a door of a passage restriction apparatus installed between the restricted area and the second area based on whether or not the second person is authorized for the passage.

(Supplementary Note 20)

The information processing method according to supplementary note 18 or 19 further comprising:

acquiring balance information on the first person, wherein the determining is performed further based on the balance information.

(Supplementary Note 21)

The information processing method according to any one of supplementary notes 16 to 20 further comprising:

storing the acquired first biometrics information group in a storage unit; and deleting, from the first biometrics information group, biometrics information on the first person that matches a predetermined condition.

(Supplementary Note 22)

The information processing method according to supplementary note 21, wherein the predetermined condition is that elapsed time from time of registration to the storage unit reaches predetermined time.

(Supplementary Note 23)

A program that causes a computer to perform:

acquiring a first biometrics information group including biometrics information on a first person detected from a first image captured in a first area from a registered biometrics information group including biometrics information on a plurality of registrants; and matching biometrics information on a second person detected from a second image captured in a second area that is different from the first area against biometrics information included in the first biometrics information group.

What is claimed is:

1. An information processing apparatus comprising:
a memory configured to store instructions; and
at least one processor configured to execute the instructions to:
perform a first matching process of matching biometrics information on a first person, detected from a first image captured in a plurality of first areas that is more distant from a restricted area than a second area that, along a path from the plurality of first areas to the restricted area, is between the plurality of first areas and the restricted area, against a registered biometrics information group including biometrics information on a plurality of registrants;
identify a first biometrics information group, including biometrics information on the first person from the registered biometrics information group which comprises a plurality of biometrics information groups, based on a matching result of the first matching process;
acquire balance information of the first person included in the first biometrics information group;
perform a second matching process of matching biometrics information on a second person, detected from a second image captured in the second area, against biometrics information included in the first biometrics information group;
perform an authentication process based on a recording media possessed by the second person when a matching result in the second matching process is unsuccessful;
determine whether or not a balance indicating the balance information of the first person is greater than or equal to a billing amount;
authorize the second person for passage from the second area to the restricted area when it is determined both that the balance is greater than or equal to the billing amount and also that at least one of a matching result in the second matching process is successful and a result of the authentication process is successful;
control a passage restriction apparatus installed between the restricted area and the second area to open a door of the passage restriction apparatus when the second person is authorized for passage from the second area to the restricted area; and
delete the biometrics information of the first person, who is the second person, from the first biometrics information group when the second person is authorized for passage from the second area to the restricted area,
wherein each of the plurality of first areas is distant from the passage restriction apparatus and is set to a position that the first person necessarily passes through when moving from the plurality of first areas to the second area, and
wherein the second area is outside of the passage restriction apparatus.

2. The information processing apparatus according to claim 1, wherein the at least one processor is further configured to execute the instructions to detect the biometrics information on the second person from the second image based on feature amounts of the second person from the second image.

3. The information processing apparatus according to claim 1, wherein the at least one processor is further configured to implement the instructions to:
store the acquired first biometrics information group; and delete, from the first biometrics information group, biometrics information on the first person that matches a predetermined condition.

4. The information processing apparatus according to claim 3, wherein the at least one processor is further configured to implement the instructions to delete biometrics information on the first person for which elapsed time from time of registration reaches predetermined time.

5. The information processing apparatus according to claim 3, wherein the at least one processor is further configured to implement the instructions to delete biometrics information on the first person when biometrics information on a third person detected from a third image captured in a predetermined monitoring area matches biometrics information on the first person.

6. The information processing apparatus according to claim 3, wherein the at least one processor is further configured to implement the instructions to, when there are stored multiple pieces of biometrics information for the first person , delete biometrics information having an earlier time of registration.

7. An information processing system comprising:
a first camera that captures a plurality of first areas that is more distant from a restricted area than a second area to generate a first image, the second area being, along a path from the plurality of first areas to the restricted area, between the plurality of first areas and the restricted area;
a second camera that captures the second area to generate a second image;
a first server that performs a first matching process of matching biometrics information on a first person, detected from the first image, against a registered biometrics information group including biometrics information on a plurality of registrants and that identifies a first biometrics information group, including biometrics information on the first person from the registered biometrics information group which comprises a plurality of biometrics information groups, based on a matching result of the first matching process; and
a second server that acquires balance information of the first person included in the first biometrics information group and that performs a second matching process of matching biometrics information on a second person, detected from the second image, against biometrics information included in the first biometrics information group,
wherein the second server performs an authentication process based on a recording media possessed by the second person when a matching result in the second matching process is unsuccessful,
wherein the second server determines whether or not a balance indicating the balance information of the first person is greater than or equal to a billing amount,
wherein the second server authorizes the second person for passage from the second area to the restricted area when it is determined both that the balance is greater than or equal to the billing amount and also that at least one of a matching result in the second matching process is successfully and a result of the authentication process is successful,
wherein the second server controls a passage restriction apparatus installed between the restricted area and the second area to open a door of the passage restriction apparatus when the second person is authorized for passage from the second area to the restricted area,
wherein the second server deletes the biometrics information of the first person who is the second person from the first biometrics information group when the second person is authorized for passage from the second area to the restricted area,
wherein each of the plurality of first areas is distant from the passage restriction apparatus and is set to a position that the first person necessarily passes through when moving from the plurality of first areas to the second area, and
wherein the second area is outside of the passage restriction apparatus.

8. The information processing system according to claim 7, wherein a reference value used for determining a matching in a matching operation of biometrics information on the first person against biometrics information on the registrants in the first server is set lower than a reference value used for determining a matching in a matching operation of biometrics information on the second person against biometrics information on the first person in the second server.

9. The information processing system according to claim 7, wherein a reference value used for determining a matching in a matching operation of biometrics information on the first person against biometrics information on the registrants in the first server is set higher than a reference value used for determining a matching in a matching operation of biometrics information on the second person with biometrics information on the first person in the second server.

10. The information processing system according to claim 7, wherein a reference value at a matching operation of biometrics information on the second person against biometrics information on the first person in the second area is determined in accordance with the number of times that the same person is detected in the plurality of first areas.

11. An information processing method comprising:
performing a first matching process of matching biometrics information on a first person, detected from a first image captured in a plurality of first areas that is more distant from a restricted area than a second area that, along a path from the plurality of first areas to the restricted area, is between the plurality of first areas and the restricted area, against a registered biometrics information group including biometrics information on a plurality of registrants;
identifying a first biometrics information group, including biometrics information on the first person from the registered biometrics information group which comprises a plurality of biometrics information groups, based on a matching result of the first matching process;
acquiring balance information of the first person included in the first biometrics information group;
performing a second matching process of matching biometrics information on a second person, detected from a second image, captured in the second area against biometrics information included in the first biometrics information group;
performing an authentication process based on a recording media possessed by the second person when a matching result in the second matching process is unsuccessful;
determining whether or not a balance indicating the balance information of the first person is greater than or equal to a billing amount;
authorizing the second person for passage from the second area to the restricted area when it is determined both that the balance is greater than or equal to the billing amount and also that at least one of a matching result in the second matching process is successful and a result of the authentication process is successful;

controlling a passage restriction apparatus installed between the restricted area and the second area to open a door of the passage restriction apparatus when the second person is authorized for passage from the second area to the restricted area; and deleting biometrics information of the first person who is the second person from the first biometrics information group when the second person is authorized for passage from the second area to the restricted area, wherein each of the plurality of first areas is distant from the passage restriction apparatus and is set to a position that the first person necessarily passes through when moving from the plurality of first areas to the second area, wherein the second area is outside of the passage restriction apparatus.

12. The information processing method according to claim 11 further comprising:

detecting the biometrics information on the second person from the second image based on feature amounts of the second person from the second image.

13. The information processing method according to claim 11 further comprising:

storing the acquired first biometrics information group in a storage unit; and deleting, from the first biometrics information group, biometrics information on the first person that matches a predetermined condition.

14. The information processing method according to claim 13, wherein the predetermined condition is that elapsed time from time of registration to the storage unit reaches predetermined time.

* * * * *